United States Patent
Jung et al.

(10) Patent No.: US 9,629,015 B2
(45) Date of Patent: Apr. 18, 2017

(54) METHOD FOR REPORTING MOBILITY INFORMATION IN WIRELESS COMMUNICATION SYSTEM AND DEVICE FOR SUPPORTING SAME

(71) Applicant: LG ELECTRONICS INC., Seoul (KR)

(72) Inventors: Sunghoon Jung, Anyang-si (KR); Youngdae Lee, Anyang-si (KR); Sungjun Park, Anyang-si (KR); Seungjune Yi, Anyang-si (KR); Sangwon Kim, Anyang-si (KR)

(73) Assignee: LG Electronics inc., Seoul (KR)

( * ) Notice: Subject to any disclaimer, the term of this patent is extended or adjusted under 35 U.S.C. 154(b) by 43 days.

(21) Appl. No.: 14/404,392

(22) PCT Filed: May 28, 2013

(86) PCT No.: PCT/KR2013/004673
§ 371 (c)(1),
(2) Date: Nov. 26, 2014

(87) PCT Pub. No.: WO2013/180447
PCT Pub. Date: Dec. 5, 2013

(65) Prior Publication Data
US 2015/0146530 A1 May 28, 2015

Related U.S. Application Data

(60) Provisional application No. 61/652,309, filed on May 28, 2012, provisional application No. 61/677,489, filed on Jul. 31, 2012.

(51) Int. Cl.
*H04W 24/10* (2009.01)
*H04W 28/02* (2009.01)
(Continued)

(52) U.S. Cl.
CPC ....... *H04W 24/10* (2013.01); *H04W 28/0289* (2013.01); *H04W 36/0088* (2013.01);
(Continued)

(58) Field of Classification Search
None
See application file for complete search history.

(56) References Cited

U.S. PATENT DOCUMENTS

2010/0298001 A1* 11/2010 Dimou ............... G01S 5/00
455/441
2011/0086635 A1* 4/2011 Grob-Lipski ......... H04W 36/32
455/423
(Continued)

FOREIGN PATENT DOCUMENTS

KR  10-2005-0021890 A   3/2005
KR  10-2007-0105255 A   10/2007
(Continued)

*Primary Examiner* — Diane Lo
(74) *Attorney, Agent, or Firm* — Dentons US LLP

(57) ABSTRACT

A method for reporting mobility information by a terminal in a wireless communication system is provided. The method comprises: determining whether or not mobility information is reported, wherein the mobility information indicates a mobility state of the terminal; and reporting the mobility information to a network if it is determined that the mobility information is reported.

13 Claims, 13 Drawing Sheets

(51) Int. Cl.
*H04W 76/04* (2009.01)
*H04W 36/00* (2009.01)
*H04W 36/04* (2009.01)
*H04W 36/32* (2009.01)
*H04W 76/02* (2009.01)

(52) U.S. Cl.
CPC ...... *H04W 76/046* (2013.01); *H04W 36/0094* (2013.01); *H04W 36/04* (2013.01); *H04W 36/32* (2013.01); *H04W 76/028* (2013.01)

(56) References Cited

U.S. PATENT DOCUMENTS

| | | | |
|---|---|---|---|
| 2011/0287785 A1 | 11/2011 | Hu et al. | |
| 2013/0045765 A1* | 2/2013 | Laitinen | H04W 36/32 455/509 |
| 2013/0194954 A1* | 8/2013 | Dalsgaard | H04W 24/10 370/252 |
| 2015/0030001 A1* | 1/2015 | Koskinen | H04W 8/08 370/331 |

FOREIGN PATENT DOCUMENTS

| | | |
|---|---|---|
| KR | 10-2011-0011554 A | 2/2011 |
| KR | 10-2012-0011882 A | 2/2012 |
| WO | 2010-126787 A2 | 11/2010 |

\* cited by examiner

METHOD FOR REPORTING MOBILITY INFORMATION IN WIRELESS COMMUNICATION SYSTEM AND DEVICE FOR SUPPORTING SAME

This application is a National Stage Entry of International Application No. PCT/KR2013/004673 filed May 28, 2013, which claims priority to U.S. Provisional Application Nos. 61/652,309 filed May 28, 2012 and 61/677,489 filed Jul. 31, 2012, all of which are incorporated herein by reference.

BACKGROUND OF THE INVENTION

Field of the Invention

The present invention relates to wireless communications and, more particularly, to a reporting method for the mobility information of a user equipment and an apparatus for supporting the same.

Related Art

The 3rd Generation Partnership Project (3GPP) long term evolution (LTE) which is an improvement of Universal Mobile Telecommunications System (UMTS) is introduced as 3GPP release 8. The 3GPP LTE uses orthogonal frequency division multiple access (OFDMA) in downlink and uses Single Carrier-frequency division multiple access (SC-FDMA) in uplink. And multiple input multiple output (MIMO) having maximum 4 antennas is adopted. Recently, the 3GPP LTE-Advanced (LTE-A) which is an evolution of the 3GPP LTE has been discussed.

In a specific location within the coverage of the macro cell having wide coverage, a cell having narrow coverage such as a micro cell, a femto cell, a pico cell, and the like may be installed. Such cells can be called small cells.

Since a user equipment which is a representative of mobile devices moves, the quality of service which is currently provided for the user equipment may be degraded or the user equipment may find a cell that can provide better service. According to this, the user equipment may move to a new cell, which is called the mobility performance of the user equipment.

Each cell has fixed service coverage, however the user equipment moves on wireless communication systems with variable speed, therefore, the frequency of inter-cell movement of the user equipment may depend on circumstances. In order to support adequate inter-cell movement of the user equipment considering actual moving state of the user equipment, the mobility state estimation (MSE) and the method of scaling mobility parameter have been supported.

The mobility information related to the mobility state of the user equipment may be very important source for the determination of configuration optimized for the user equipment by network or for the optimization of network operation. However, since the network may not know if the user equipment has valid mobility information to report, the network may not properly request the corresponding information. In addition, unlike the mobility information that has been already reported, in case that the mobility information is updated on the user equipment, the network performs operation based on the existing mobility information since the network does not know whether the mobility information is updated. Accordingly, a method that the user equipment reports valid mobility information to the network is required.

SUMMARY OF THE INVENTION

The technical object of the present invention is to provide a reporting method for the mobility information of a user equipment and an apparatus for supporting the same.

In an aspect of the present invention, a reporting method for mobility information performed by a user equipment in a wireless communication system is provided. The method includes determining whether to report the mobility information, wherein the mobility information indicates a mobility state of the user equipment, and reporting the mobility information to a network if the user equipment decides to report the mobility information.

The method may further include transmitting a mobility information available indication indicating that there is the mobility information to report to the network, if the user equipment decides to report the mobility information.

The method may further include receiving a mobility information reporting request from the network as a response to the mobility information available indication. Reporting the mobility information to the network may be performed as a response to the mobility information reporting request.

Determining whether to report the mobility information in case that the user equipment has reported the mobility information previously may include determining to report the mobility information if the mobility information is different from the mobility information previously reported.

If a type of a mobility state indicated by the mobility information is different from a type of a mobility state indicated by the mobility information previously reported, the mobility information may be determined to be different from the mobility information previously reported.

If a type of a mobility state indicated by the mobility information is the same as a type of a mobility state indicated by the mobility information previously reported and the mobility information of the type is different from each other, the mobility information may be determined to be different from the mobility information previously reported.

The type of the mobility state may be one of a mobility state estimated by mobility state estimation (MSE), a mobility group state in which the mobility states estimated by the MSE are grouped, a speed of the user equipment, and a list for at least one cell in which the user equipment camped on and a time when the user equipment camps on the corresponding cell.

Determining whether to report the mobility information in case that the user equipment has never reported the mobility information previously may include determining to report the mobility information if the user equipment has the mobility information.

The method may further include receiving mobility information report control information from the network. The mobility information report control information may indicate whether the report of the mobility information is permitted.

Determining whether to report the mobility information may be performed, if the report of the mobility information is permitted by the mobility information report control information.

The mobility information report control information may further indicate a type of the mobility information in which the report is permitted. Determining whether to report the mobility information may be performed, if the report of the mobility information is permitted by the mobility information report control information and the type of the mobility information is the type of the mobility information indicated by the mobility information report control information.

The mobility information available indication may be transmitted with being included in a radio resource control (RRC) message that the user equipment requests a RRC connection.

The mobility information reporting request may be transmitted with being included in a RRC message requesting to report the user equipment information.

The mobility information may be transmitted with being included in a RRC message transmitted to report the user equipment information.

In another aspect of the present invention, a wireless apparatus which is performing in a wireless communication system is provided. The wireless apparatus includes a radio frequency (RF) unit that transmits and receives a radio signal, and a processor operating functionally connected with the RF unit. The process is configured to perform determining whether to report the mobility information, the mobility information indicates a mobility state of the user equipment, and reporting the mobility information to a network if the user equipment decides to report the mobility information.

According to the embodiments of the present invention, the network may know whether a user equipment has valid mobility information to report, and further know the type of mobility state indicated by the mobility information. According to this, the network may determine whether to acquire the mobility information from the user equipment according to the operation policy, the mobility state and/or the type of mobility state. In addition, the network may know whether the mobility information is updated, and accordingly, the network may acquire the updated mobility information and provide the user equipment with proper configuration information. Through the procedures, the excessive signaling overhead which may occur due to the mobility information report may be prevented, and it may be possible to perform the effective power management of the user equipment, the mobility management of the user equipment and the optimized network operation based on the mobility information which is reported.

DESCRIPTION OF EXEMPLARY EMBODIMENTS

Figure 1:
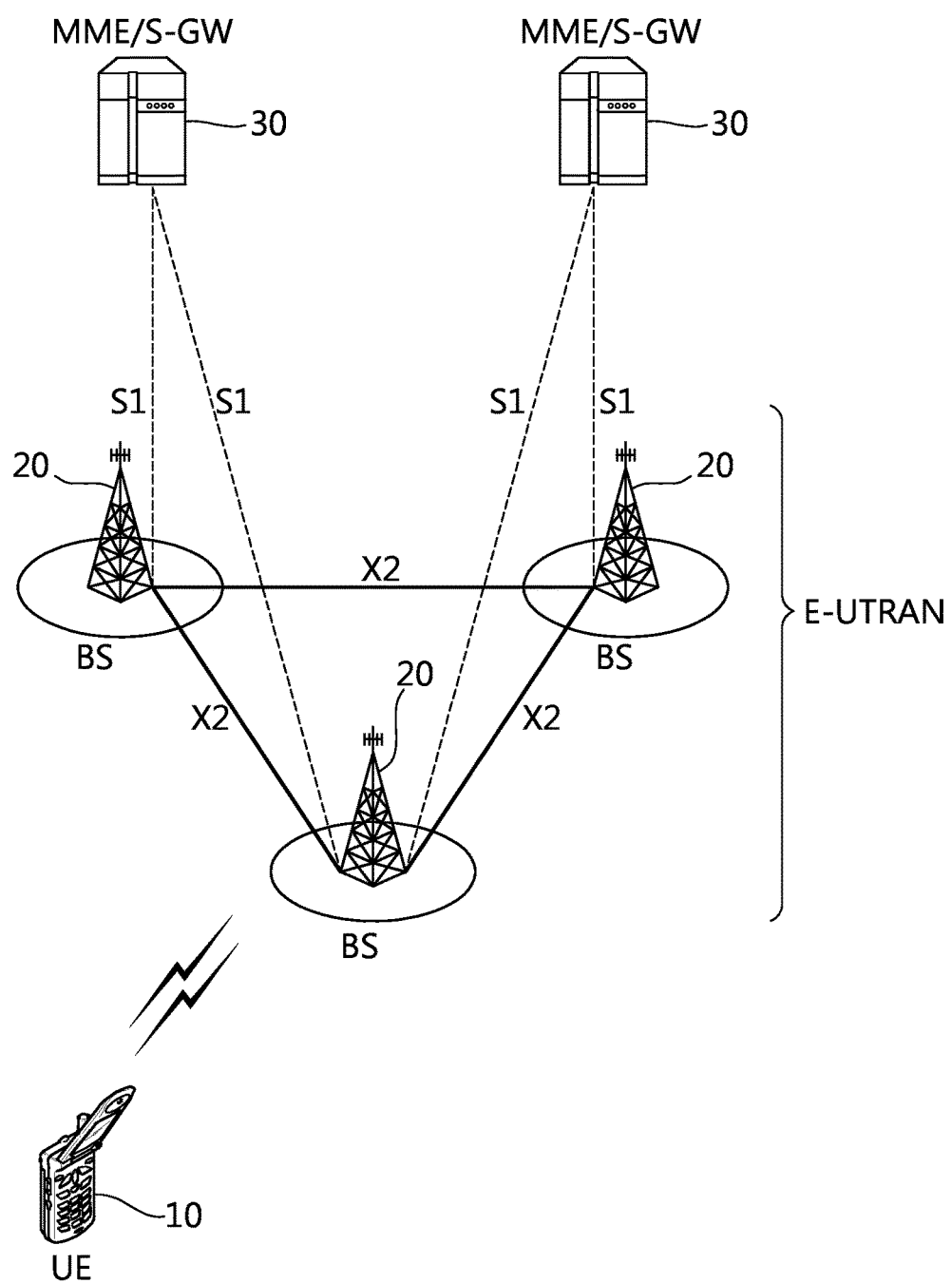
FIG. 1 illustrates a wireless communication system to which the present invention is applied.

FIG. 1 illustrates a wireless communication system to which the present invention is applied. This may also be called an evolved-UMTS terrestrial radio access network (E-UTRAN) or a long term evolution (LTE)/LTE-A system.

The E-UTRAN includes a base station (BS) 20 that provides a control plane and a user plane to a user equipment (UE) 10. The UE 10 may be fixed or movable and may be called other terms such as a mobile station (MS), a user terminal (UT), a subscriber station (SS), a mobile terminal (MT), a wireless device, and the like. The base station 20 represents a fixed station that communicates with the UE 10, and may be called other terms such as an evolved-NodeB (eNB), a base transceiver system (BTS), an access point, and the like.

The base stations 20 may be connected to each other through an X2 interface. The base station 20 is connected with an evolved packet core (EPC) 30 through an S1 interface, in more detail, a mobility management entity (MME) through an S1 MME and a serving gateway (S-GW) through an S1-U.

The EPC 30 is constituted the MME, the S-GW, and a packet data network gateway (P-GW). The MME has access information of the UE or information on a capability of the UE, and the information is primarily used for mobility management of the UE. The S-GW is a gateway having the E-UTRAN as an end point and the P-GW is a gateway having a PDN as the end point.

Layers of a radio interface protocol between the UE and a network may be divided into an L1 (first layer), an L2 (second layer), and an L3 (third layer) based three lower layers of an open system interconnection (OSI) reference model which is widely known in a communication system and among them, a physical layer that belongs to the first layer provides an information transfer service using a physical channel and a radio resource control (RRC) layer positioned on the third layer serves to control radio resources between the UE and the network. For this, the RRC layer exchanges an RRC message between the UE and the base station.

Figure 2:
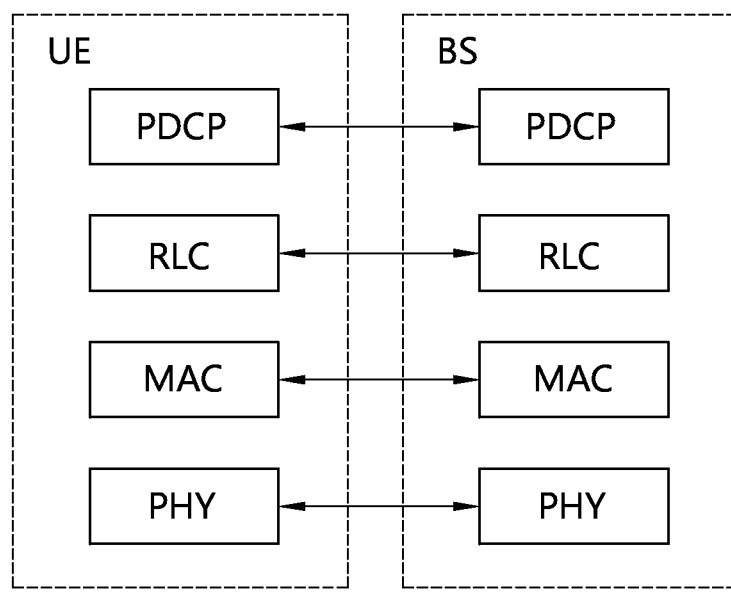
FIG. 2 is a block diagram illustrating a radio protocol architecture for a user plane.
Figure 3:
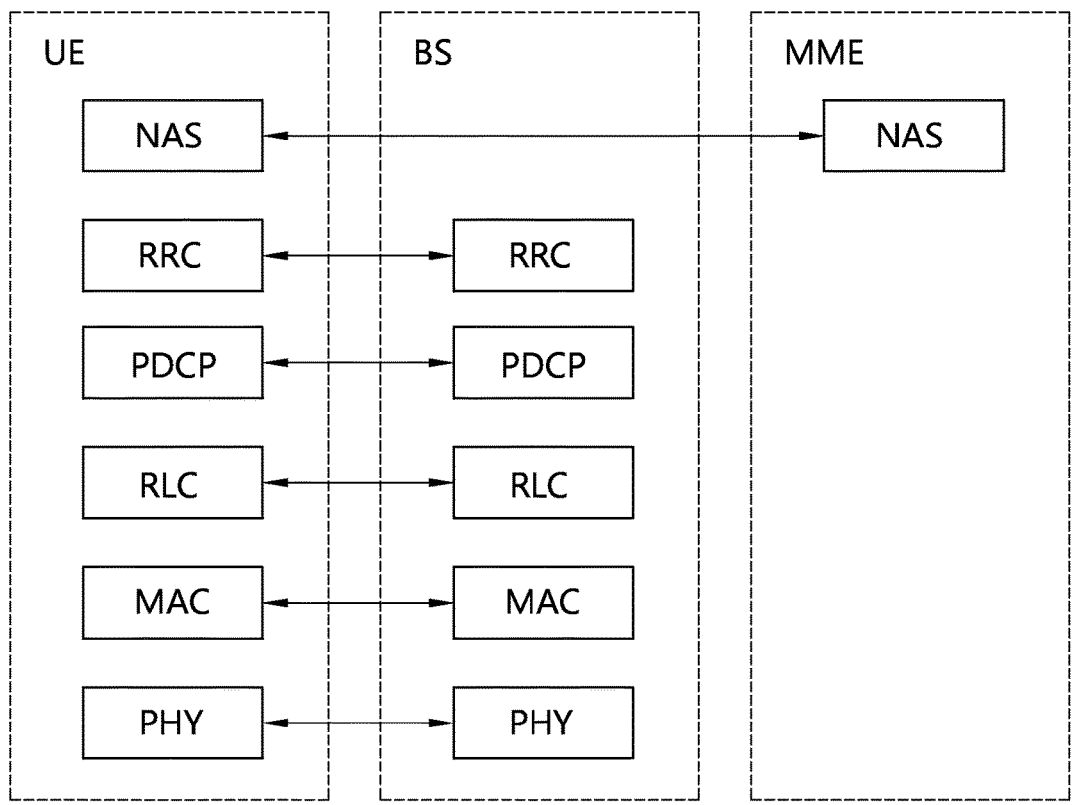
FIG. 3 is a block diagram illustrating a radio protocol architecture for a control plane.

FIG. 2 is a block diagram illustrating a radio protocol architecture for a user plane. FIG. 3 is a block diagram illustrating a radio protocol architecture for a control plane. A data plane is a protocol stack for user data transmission and the control plane is a protocol stack for transmitting a control signal.

Referring to FIGS. 2 and 3, a physical (PHY) layer provides the information transfer service to an upper layer by using the physical channel. The physical layer is connected with a medium access control (MAC) layer as an upper layer through a transport channel. Data move between the MAC layer and the physical layer through the transport channel. The transport channel is classified depending on a transmission method and a transmission feature through a radio interface.

Data move between different physical layers, that is, between physical layers of a transmitter and a receiver through the physical channel. The physical channel may be modulated by orthogonal frequency division multiplexing (OFDM) and uses a time and a frequency as the radio resource.

A function of the MAC layer includes mapping between a logic channel and the transport channel, and multiplexing/demultiplexing to a transport block provided to the physical channel onto the transport channel of an MAC service data unit (SDU) that belongs to the logic channel. The MAC layer provides a service to a radio link control (RLC) layer through the logic channel.

A function of the RLC layer includes concatenation, segmentation, and reassembly of an RLC SDU. In order to assure various quality of services (QoS) requested by a radio bearer (RB), the RLC layer provides three operating modes of a transparent mode (TM), an unacknowledged mode (UM), and an acknowledged mode (AM). An AM RLC provides error correction through an automatic repeat request (ARQ).

The radio resource control (RRC) layer is defined only on the control plane. The RRC layer serves to control the logic channel, the transport channel and the physical channels in association with configuration, re-configuration, and release of radio bearers. The RB means a logic route provided by the first layer (PHY layer) and the second layers (the MAC layer, the RLC layer, and the PDCP layer) in order to transfer data between the UE and the network.

A function of a packet data convergence protocol (PDCP) layer on the user plane includes transferring of user data, header compression, and ciphering. A function of a packet data convergence protocol (PDCP) layer on the user plane includes transferring of control plane data and ciphering/integrity protection.

Setting the RB defines features of the radio protocol layer and channel in order to provide a specific service and means a process of setting respective detailed parameters and operating methods. The RB may be re-divided into two types of a signaling RB (SRB) and a data RB (DRB). The SRB is used as a passage for transmitting the RRC message on the control plane and the DRB is used as a passage for transmitting the user data on the user plane.

When an RRC connection is established between the RRC layer of the UE and the RRC layer of the E-UTRAN, the UE is in an RRC connected state and if not, the UE is in an RRC idle state.

A downlink transport channel for transmitting data from the network to the UE includes a broadcast channel (BCH) for transmitting system information and besides, the downlink transport channel includes a downlink shared channel (SCH) for transmitting user traffic or a control message. Traffic or a control message of a downlink multicast or broadcast service may be transported through the downlink SCH or transported through an additional downlink multicast channel (MCH). Meanwhile, an uplink transport channel for transporting data from the UE to the network includes a random access channel (RACH) for transporting an initial control message and besides, an uplink shared channel (SCH) for transporting the user traffic or control message.

The logical channel that is positioned on the transport channel and mapped to the transport channel includes a broadcast control channel (BCCH), a paging control channel (PCCH), a common control channel (CCCH), a multicast control channel (MCCH), a multicast traffic channel (MTCH), and the like.

The physical channel is constituted by a plurality of OFDM symbols in a time domain and a plurality of sub-carriers in a frequency domain. One sub-frame is constituted by the plurality of OFDM symbols in the time domain. A resource block as a resource allocation unit is constituted by the plurality of OFDM symbols and the plurality of sub-carriers. Further, each sub-frame may use specific sub-carriers of specific OFDM symbols (e.g., a first OFDM symbol) of a corresponding sub-frame for the physical downlink control channel (PDCCH), that is, an L1/L2 control channel. A transmission time interval (TTI) is a unit time of transmitting the sub-frame.

Hereinafter, the RRC state and the RRC connection method of the UE will be described in detail.

The RRC state represents whether the RRC layer of the UE is logically connected with the RRC layer of the E-UTRAN and a case in which both RRC layers are logically connected to each other is called the RRC connection state and a case in which both RRC layers are not logically connected to each other is called the RRC idle state. Since the RRC connection exists in the UE in the RRC connection state, the E-UTRAN may determine the existence of the corresponding UE by the unit of a cell to thereby effectively control the UE. On the contrary, the E-UTRAN may not determine the UE in the RRC idle state and a core network (CN) is managed by the unit of a tracking area which a region unit larger than the cell. That is, it is determined whether the UE in the RRC idle state exists by the unit of a large region, and the UE needs to move to the RRC connection state in order to receive a general mobile communication service such as voice or data.

When a user first turns on a power supply of the UE, the UE first retrieves an appropriate and thereafter, the UE stays in the RRC idle state in the corresponding cell. The UE in the RRC idle state establishes the RRC connection with the E-UTRAN through an RRC connection procedure at least when the UE in the RRC idle state needs to make the RRC connection, and is transited to the RRC connections state. Cases in which the UE in the RRC idle state needs to make the RRC connection are various, and for example, uplink data transmission is required due to a user's call attempt or when a paging message is received from the E-UTRAN, the cases may include response message transmission thereto.

A non-access stratum layer (NAS) located above the RRC layer performs functions such as session management and mobility management.

In order to manage mobility of the UE on the NAS layer, two states of EPS mobility management (EMM)-REGISTERED and EMM-DEREGISTERED are defined and both states are applied to the UE and the MME. An initial UE is in the EMM-DEREGISTERED state and the UE performs a process of registering the initial UE in a corresponding network through an initial attach procedure in order to access the network. When the attach procedure is successfully performed, the UE and the MME are in the EMM-REGISTERED state.

In order to manage a signaling connection between the UE and the EPC, two states of an EPS connection management (ECM)-IDLE state and an ECM-CONNECTED state are defined and both states are applied to the UE and the MME. When the UE in the ECM-IDLE state makes the RRC connection with the E-UTRAN, the corresponding UE is in the ECM-CONNECTED state. When the MME in the ECM-IDLE state makes an S1 connection with the E-UTRAN, the MME is in the ECM-CONNECTED state. When the UE is in the ECM-IDLE state, the E-UTRAN does not have context information of the UE. Therefore, the UE in the ECM-IDLE state performs a UE based mobility associated procedure such as cell selection or cell reselection without the need for receiving a command of the network. On the contrary, when the UE is in the ECM-CONNECTED state, the mobility of the UE is managed by the command of the network. When the position of the UE in the ECM-IDLE state is different from a position which the network knows, the UE notifies a corresponding position of the UE to the network through a tracking area update procedure.

Next, the system information will be described.

The system information includes required information which the UE needs to know to access the base station. Therefore, the UE needs to receive all of the system information before accessing the base station and further, the UE continuously needs to have latest system information. In addition, since the system information is information which all UEs in one cell need to know, the base station periodically transmits the system information.

According to Phrase 5.2.2 of 3GPP TS 36.331 V8.7.0 (2009-09) "Radio Resource Control (RRC); Protocol specification (Release 8)", the system information is divided in to a master information block (MIB), a scheduling block (SB), and a system information block (SIB). The MIB allows the UE to know a physical component, for example, a bandwidth. The SB allows the UE to know transmission information of the SIBs, for example, a transmission period, and the like. The SIB is an aggregate of associated system information. For example, any SIB includes only information on a neighboring cell and any SIB includes only information on an uplink wireless channel used by the UE.

In general, a service which the network provides to the UE may be divided into three types. Further, the UE differently recognizes even a type of the cell by considering which service the UE receives. The service type will be first described below and thereafter, the type of the cell will be described.

1) Limited service: The service may provide an emergency call and an earthquake and Tsunami warning system (ETWS), and provide the emergency call and the earthquake and Tsunami warning system (ETWS) in an acceptable cell.

2) Normal service: The service may mean a public use general service and may provide the public use general service in a suitable or normal cell.

3) Operator service: The service may mean a service for a communication network operator and only the communication network operator may use the cell and a general user may not use the cell.

The type of the cell may be divided as below in association with the service type provided by the cell.

1) Acceptable cell: Cell where the UE may receive the limited service. The cell is a cell that is not barred in terms of the corresponding UE and satisfies a cell selection criterion of the UE.

2) Suitable cell: Cell where the UE may receive the suitable service. The cell satisfies a condition of the acceptable cell and simultaneously, satisfies additional conditions. As the additional conditions, the cell needs to belong to a public land mobile network (PLMN) which the corresponding UE may access and needs to be a cell where execution of the tracking area update procedure of the UE is not barred. When the corresponding cell is the CSG cell, the corresponding cell needs to be a cell where the UE may access the cell as a CSG member.

3) Barred cell: The cell is a cell where information indicating that the corresponding cell is a cell barred through the system information is broadcasted.

4) Reserved cell: The cell is a cell where information indicating that the corresponding cell is a cell reserved through the system information is broadcasted.

Figure 4:
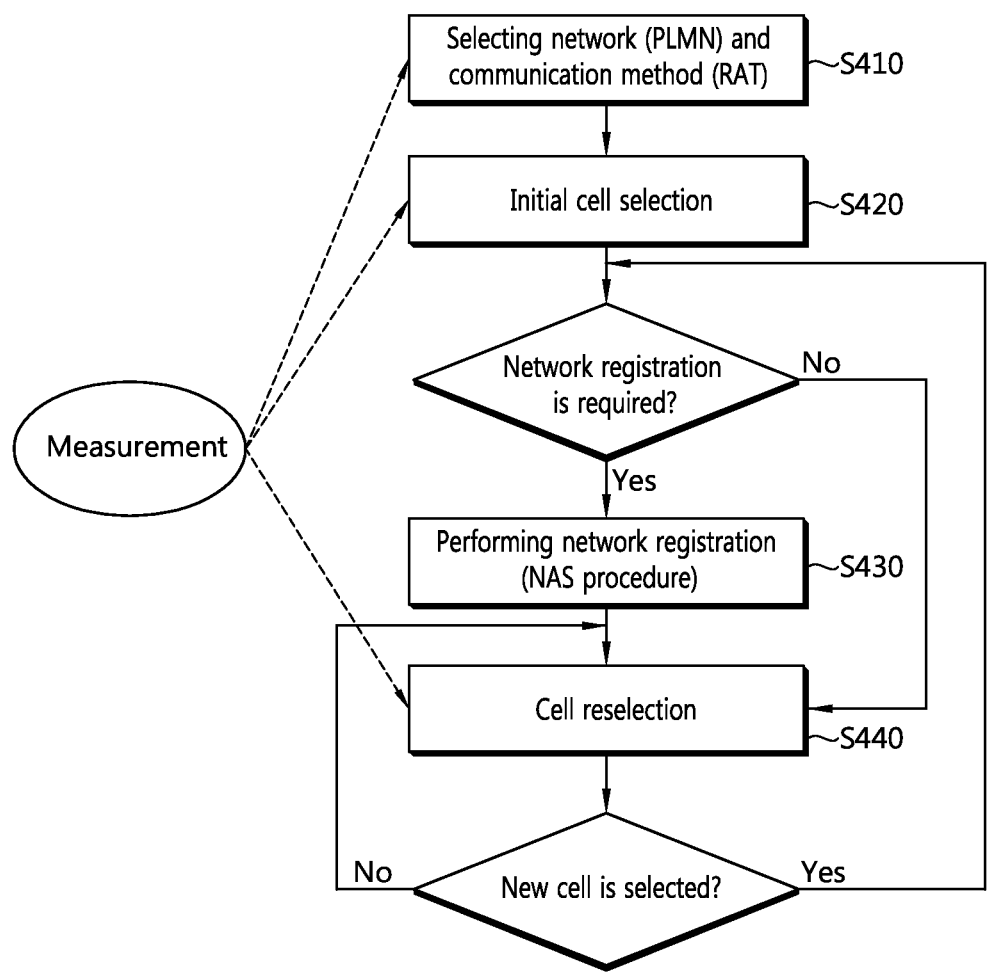
FIG. 4 is a flowchart illustrating an operation of a UE in an RRC idle state.

FIG. 4 is a flowchart illustrating an operation of a UE in an RRC idle state. FIG. 4 illustrates a procedure of registering a UE of which initial power is turned on in the network through a cell selection process and thereafter, cell reselection is performed as necessary.

Referring to FIG. 4, the UE selects radio access technology (RAT) for communicating with the public land mobile network from which the UE itself intends to receive the service (step, S410). Information on the PLMN and the RAT may be selected by a user of the UE and the information stored in a universal subscriber identity module (USIM) may be used.

The UE selects a cell having a largest value among cell having measured larger signal intensity or quality than specific values (cell selection) (step, S420). The UE of which power is turned on performs the cell selection and the execution of the cell selection may be called initial cell selection. A cell selection procedure will be described below in detail. After the cell selection, the UE receives the system information which the base station periodically sends. The aforementioned specific value represents a value defined in the system in order to receive an assurance for quality of a physical signal in transmitting/receiving data. Therefore, the value may vary depending on the applied RAT.

When network registration is required, the UE performs a network registration procedure (step, S430). The UE registers its own information (e.g., IMSI) in order to receive a service (e.g., paging) from the network. The UE does not register the information in the accessed network whenever selecting the cell, and registers the information when information (e.g., a tracking area identity; TAI) of the network that receives from the system information is different from information on a network known by the UE.

The UE performs the cell reselection based on a service environment provided by the cell or an environment of the UE (step, S440). When a value of measured intensity or quality of the signal from a base station from which the UE receives the service is smaller than a value measured from a base station of a neighboring cell, the UE selects one of other cells that provide a more excellent signal feature than the cell of the base station accessed by the UE. This process is distinguished from the initial cell selection as Process No. 2 to be cell re-selection. In this case, a temporal constraint is given in order to prevent the cell from being frequently reselected with the variation of the signal feature. A cell selection procedure will be described below in detail.

Figure 5:
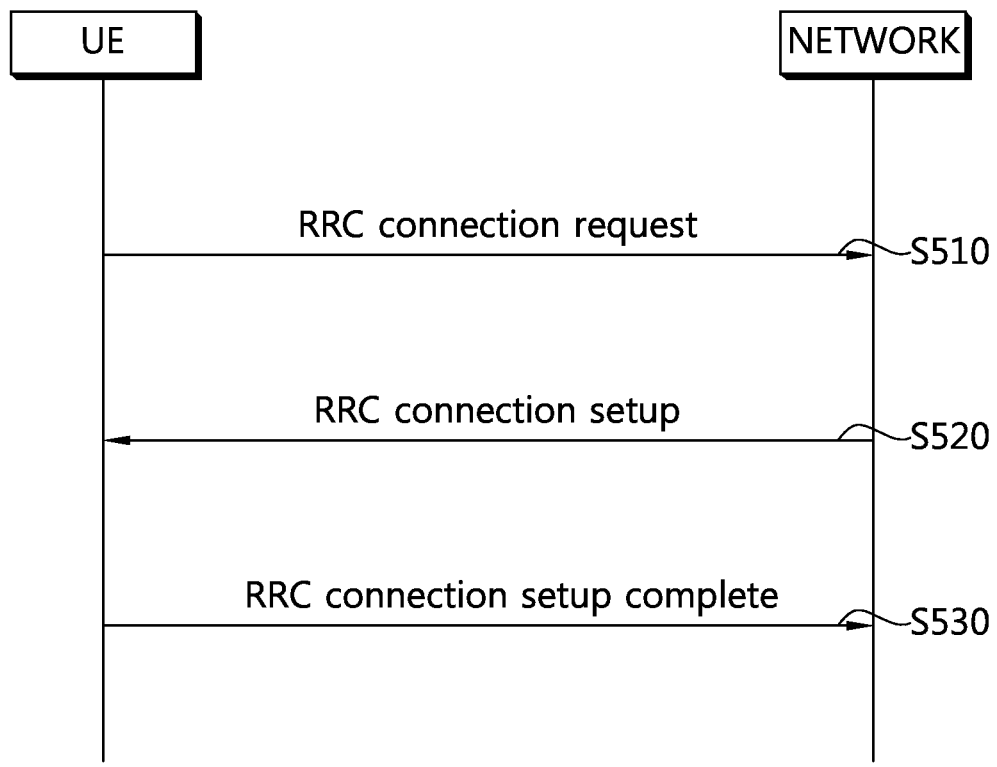
FIG. 5 is a flowchart illustrating a procedure of establishing an RRC connection.

FIG. 5 is a flowchart illustrating a procedure of establishing an RRC connection.

The UE sends to the network an RRC connection request message for requesting the RRC connection (step, S510). The network sends an RRC connection setup message as a response to the RRC connection request (step, S520). The UE enters an RRC connection mode after receiving the RRC connection setup message.

The UE sends to the network an RRC connection setup complete message used to verify successful completion of establishing the RRC connection (step, S530).

Figure 6:
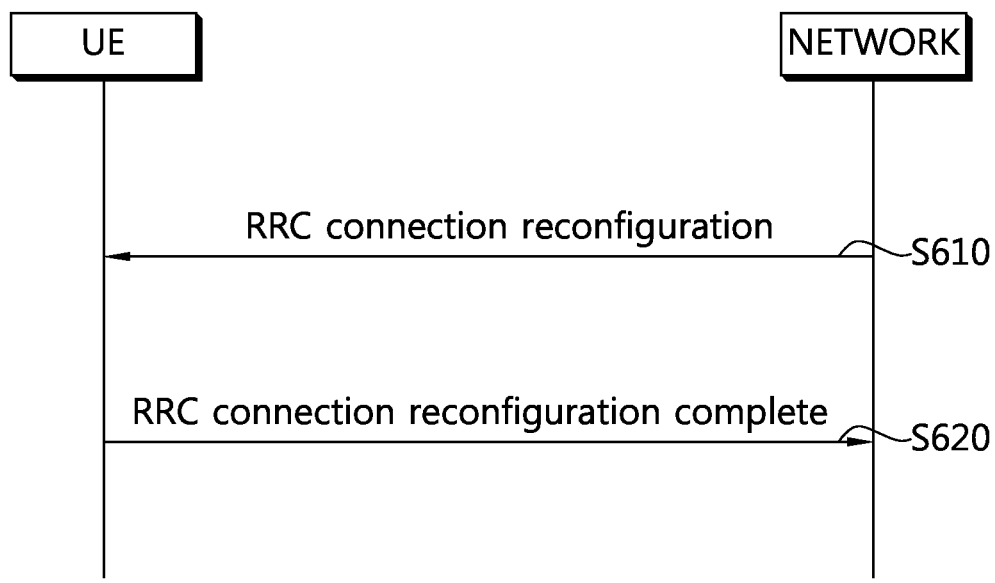
FIG. 6 is a flowchart illustrating a procedure of reconfiguring the RRC connection.

FIG. 6 is a flowchart illustrating a procedure of reconfiguring the RRC connection. The RRC connection reconfiguration is used to modify the RRC connection. The RRC connection reconfiguration is used for perform RB establishment/modification/release, handover, and measurement setup/modification/release.

The network sends to the UE an RRC connection setup message for modifying the RRC connection (step, S610). The UE sends to the network an RRC connection reconfiguration complete message used to verify successful completion of establishing the RRC connection reconfiguration as a response to the RRC connection reconfiguration (step, S620).

Hereinafter, a public land mobile network (PLMN) will be described.

The PLMN is a network that is deployed and operated by mobile network operators. Each mobile network operator operates one or more PLMN. Each PLMN may be distinguished by Mobile Country Code (MCC) and Mobile Network Code (MNC). The PLMN information of cells is included in the system information and broadcasted.

For selecting PLMN, cells and reselecting cells, various types of PLMNs may be considered by a UE.

HPLMN (Home PLMN): The PLMN having MCC and MNC which are respectively matched to MCC and MNC of a UE IMSI.

EHPLMN (Equivalent HPLMN): The PLMN handled to be equivalent to the HPLMN.

RPLMN (Registered PLMN): The PLMN of which the location is successfully registered.

EPLMN (Equivalent PLMN): The PLMN handled to be equivalent to the RPLMN.

Each consumer of the mobile service subscribes to the HPLMN. When the general service is provided for a UE through the HPLMN or the EHPLMN, the UE is not in the roaming state. On the other hand, a service is provided for a UE through the PLMN except the HPLMN/EHPLMN, the UE is in the roaming state, and the PLMN is called Visited PLMN (VPLMN).

When the power of the UE is turned on at an initial stage, the UE retrieves the public land mobile network (PLMN) and selects an appropriate PLMN capable of receiving the service. The PLMN is a network that is deployed or operated by a mobile network operator. Each mobile network operator operates one or more PLMNs. Each of the PLMNs may be identified by a mobile country code (MCC) and a mobile network code (MNC). The PLMN information of the cell is included in the system information and broadcasted. The UE attempts to register the selected PLMN. When the registration is succeeded, the selected PLMN becomes a registered PLMN (RPLMN). The network may signal a PLMN list to the UE and the PLMNs included in the PLMN list may be considered as the PLMN such as the RPLMN. The UE registered in the network needs to be reachable by the network. When the UE is in the ECM-CONNECTED state (similarly, the RRC connection state), the network recognizes that the UE receives the service. However, when the UE is in the ECM-IDLE state (similarly, the RRC idle state), a situation of the UE is not effective in the eNB, but the situation is stored in the MME. In this case, the position of the UE which is in the ECM-IDLE state is known to only the MME as granularity of a list of tracking areas (TAs). A single TA is identified by a tracking area identity configured by the PLMN identity to which the TA belongs and the tracking area code (TAC) uniquely expressing the TA in the PLMN.

Subsequently, the UE selects a cell having signal quality and feature to receive an appropriate service among cells provided by the selected PLMN.

Next, a procedure of a UE selecting a cell will be described in detail.

When power is turned on or being remained in a cell, the UE performs the procedures to be serviced by selecting/reselecting a cell of adequate quality.

The UE in the RRC idle state should select the cell of adequate quality always and be ready for being serviced through the cell. For example, the UE which is just turned on should select a cell of adequate quality in order to register a network. When the UE in the RRC connection state enters the RRC idle state, the UE should select the cell which is going to remain in the RRC idle state. As such, the procedure of selecting a cell satisfying a certain condition in order for the UE to remain in the service standby state such as the RRC idle state is called the Cell Selection. It is an important point to select the cell as quick as possible, since the cell selection is performed in the state that the cell where the UE remains in the RRC idle state is not yet determined. Accordingly, if the cell provides a high level of wireless signal quality, the cell can be selected in the procedure of cell selection although the cell is not a cell that provides the best wireless signal quality.

Now, with reference to 3GPP TS 36.304 V8.5.0 (2009-03) "User Equipment (UE) procedures in idle mode (Release 8)", the method and procedure that a UE select a cell in 3GPP LTE will be described.

The cell selection process is generally divided into two ways.

First, as an initial cell selection process, the UE has no advance information on the radio channel during this process. Therefore, the UE retrieves all radio channels in order to find the appropriate cell. The UE finds the strongest cell in each channel. Thereafter, the UE selects the corresponding cell only at the time of finding the suitable cell that satisfies the cell selection criterion.

Next, the UE may select the cell by using stored information or using information broadcasted in the cell. Therefore, the cell selection may be rapidly performed as compared with the initial cell selection process. When the UE only finds the cell that satisfies the cell selection criterion, the UE selects the corresponding cell. When the UE does not find the suitable cell that satisfies the cell selection criterion through such a process, the UE performs the initial cell selection process.

After the UE selects a predetermined cell through the cell selection process, the strength or quality of the signal between the UE and the base station may be changed due to the mobility of the UE or a change of a wireless environment. Therefore, when the quality of the selected cell deteriorates, the UE may select other cell that provides higher quality. When the cell is again selected as such, a cell that provides higher signal quality than the currently selected cell is generally selected. The process is referred to as the cell reselection. The cell reselection process generally has a basic object to select the cell having the highest quality to the UE.

In addition to the quality of the radio signal, the network decides a priority for each frequency to notify the priority to the UE. The UE that receives the priority preferentially considers the priority to a radio signal quality criterion during the cell reselection process.

There may be a method for selecting or reselecting the cell according to the signal feature of the wireless environment and there may be a cell reselection method described below according to the features of the RAT and the frequency of the cell.

Intra-frequency cell reselection: The UE reselects a cell having the same RAT and the same center-frequency as a cell which is being camping.

Inter-frequency cell reselection: The UE reselects a cell having the same RAT and a different center-frequency as the cell which is being camping.

Inter-RAT cell reselection: The UE reselect a cell using an RAT different from an RAT which is being camping.

A principle of the cell reselection process will be described below.

First, the UE measures the qualities of the serving cell and the neighboring cell for the cell reselection.

Second, the reselection is performed based on the cell reselection criterion. The cell reselection criterion has features described below in association with the measurement of the serving cell and the neighboring cell.

The intra-frequency cell reselection is basically based on ranking. The ranking defines an index value for evaluating the cell reselection and the cells are ordered in the order of the index value by using the index value. A cell having the best index is generally called a best ranked cell. The cell index value is based on a value which the UE measures for the corresponding cell and is applied with a frequency offset or a cell offset as necessary.

The inter-frequency cell reselection is based on a frequency priority provided by the network. The UE attempts to camp on a frequency having the highest frequency priority. The network may provide the frequency priority to which UEs in cell will commonly apply through broadcast signaling or provide a frequency-dedicated priority for each UE through UE-dedicated signaling. The cell reselection priority provided through the broadcast signaling may be called the common priority, and the cell reselection priority setup by the network for each UE may be called the dedicated priority. When the UE receives the dedicated priority, the UE may receive the relevant validity time together with the dedicated priority. When the UE receives the dedicated priority, the UE starts the validity timer which is setup as the relevant validity time. The UE applies the dedicated priority in the RRC idle mode while the validity timer is operating. If the validity timer is terminated, the UE discards the dedicated priority and applies the common priority again.

The network may provide a parameter (e.g., a frequency-specific offset) used for the cell reselection to the UE for the inter-frequency cell reselection for each frequency.

The network may provide a neighboring cell list (NCL) used for the cell reselection to the UE for the intra-frequency cell reselection or the inter-frequency cell reselection. The NCL includes a cell-specific parameter (e.g., cell-specific offset) used in the cell reselection.

The network may provide a cell reselection black list used for the cell reselection to the UE for the intra-frequency cell reselection or the inter-frequency cell reselection. The UE does not perform the cell reselection for a cell included in the black list.

Subsequently, a ranking performed during the cell reselection evaluating process will be described.

A ranking criterion used for giving the priority of the cell is defined as illustrated in Equation 1.

$$R_S = Q_{meas,s} + Q_{hyst}, R_n = Q_{meas,n} - Q_{offset}$$

Herein, $R_s$ represents a ranking criterion of the serving cell, $R_n$ represents a ranking criterion of the neighboring cell, $Q_{meas,s}$ represents a quality value which the UE measures for the serving cell, $Q_{meas,n}$ represents a quality value which the UE measures for a neighboring cell, $Q_{hyst}$ represents a hysteresis value for the ranking, and $Q_{offset}$ represents an offset between two cells.

In an intra-frequency, when the UE receives an offset $Q_{offsets,n}$ between the serving cell and the neighboring cell, $Q_{offset} = Q_{offsets,n}$ and when the UE does not receive $Q_{offsets,n}$, $Q_{offset} = 0$.

In an inter-frequency, when the UE receives the offset $Q_{offsets,n}$ for the corresponding cell, $Q_{offset} = Q_{offsets,n} + Q_{frequency}$ and when the UE does not receive $Q_{offsets,n}$, $Q_{offset} = Q_{frequency}$.

When the ranking varies while the ranking criterion Rs of the serving cell and the ranking criterion of the neighboring cell $R_n$ are similar to each other, the ranking is frequently reversed, and as a result, the UE may alternatively reselect both cells. $Q_{hyst}$ represents a parameter for preventing the UE from alternatively reselecting both cells by giving hysteresis in cell reselection.

The UE measures the $R_s$ of the serving cell and the $R_n$ of the neighboring cell according to the above equation and regards a cell having the largest ranking criterion value as the best ranked cell and reselects this cell.

According to the criterion, it can be seen that the quality of the cell acts as the most important criterion in the cell reselection. If the reselected cell is not the suitable cell, the UE excludes the corresponding frequency or the corresponding cell from a cell reselection target.

Hereinafter, a radio link monitoring (RLM) will be described.

A UE monitors DL quality based on the cell-specific reference signal in order to detect the DL wireless link quality of the PCell. The UE estimates DL wireless link quality for monitoring the DL wireless link quality of the PCell and compares it with the threshold values Qout and Qin. The threshold value Qout is defined with the level in which the DL wireless link cannot be stably received, and it corresponds to 10% block error rate of hypothetical PDCCH transmission considering the PDFICH error rate. The threshold value Qin is defined with the level in which the DL wireless link can be stably received, better than the level of the Qout, and it corresponds to 2% block error rate of hypothetical PDCCH transmission considering the PCFICH error rate.

Hereinafter, a radio link failure (RLF) will be described.

The UE performs continuously performs measurement for the quality of a radio link with the serving cell that receives the service. The UE decides whether communication is impossible under a current situation due to deterioration in quality of the radio link with the serving cell. When the communication is almost impossible due to too low quality of the serving cell, the UE decides the current situation as a wireless connection failure.

When a radio link failure is decided, the UE abandons maintaining communication with a current serving cell, selects a new cell through the cell selection (alternatively, cell reselection) procedure, and attempts RRC connection re-establishment to a new cell.

In the specification of 3GPP LTE, the cases which are not able to do the normal communication are exemplified as follows.

The case that the UE determines that there is a serious problem in the downlink communication link quality based on the radio quality measurement result of the physical layer of the UE (The case of determining that the quality of the PCell is low during performing the RLM).

The case that the UE determines that there is a problem in the uplink transmission since the random access process continuously fails on the MAC sub layer.

The case that the UE determines that there is a problem in the uplink transmission since the uplink data transmission continuously fails on the RLC sub layer.

The case that the UE determines that the handover fails.

The case that the message received by the UE does not pass the integrity check.

Hereinafter, a process of the RRC connection re-establishment will be described in more detail.

Figure 7:
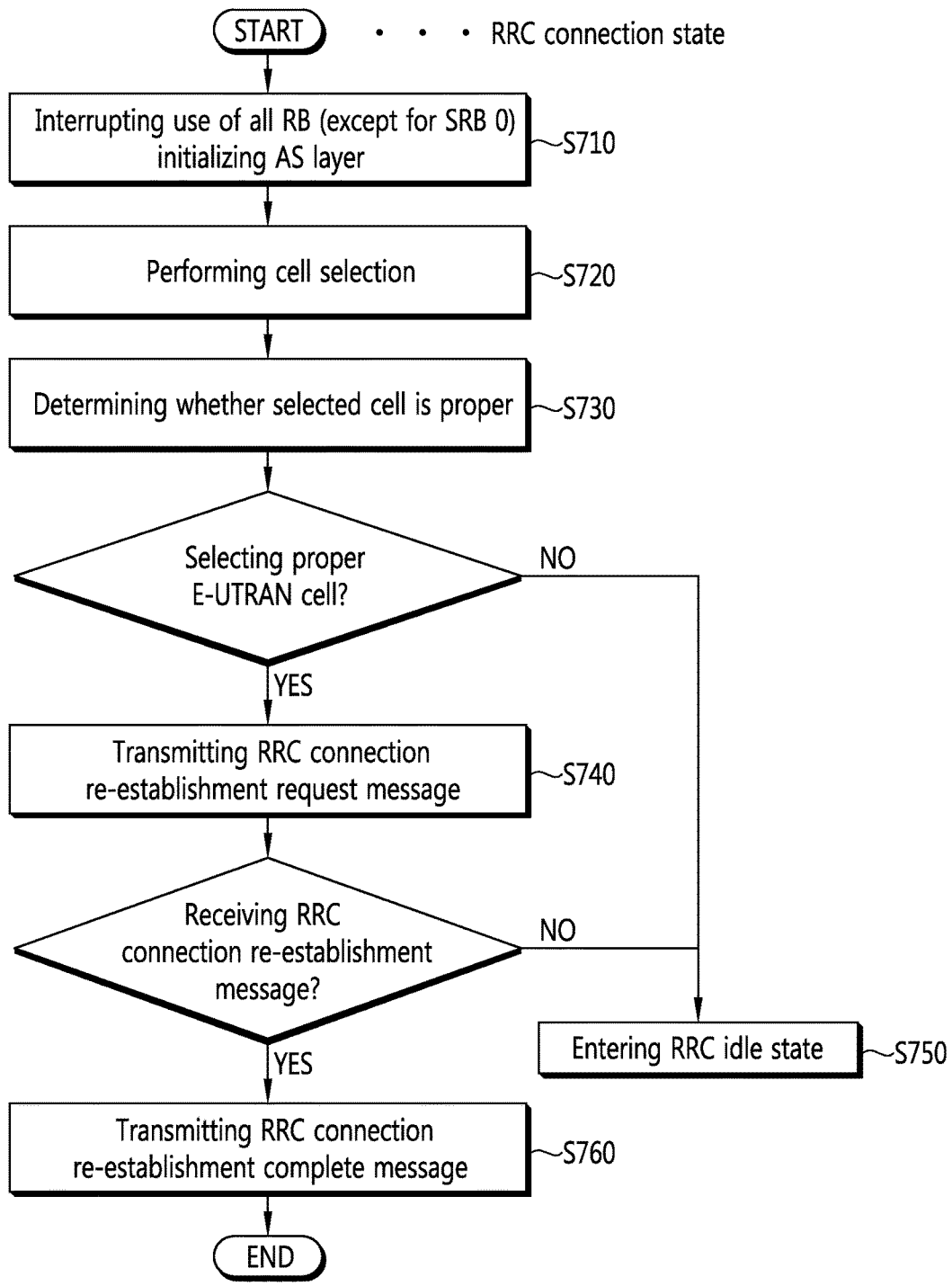
FIG. 7 is a drawing illustrating the procedure of the RRC connection re-establishment.

FIG. 7 is a drawing illustrating the procedure of the RRC connection re-establishment.

Referring to FIG. 7, the UE interrupts the use of all radio bearers which was configured except for the Signaling Radio Bearer #0, and initializes all sorts of sub layers of access stratum (AS). In addition, each sub layer and physical layer is configured as default configuration. During this process, the UE maintains the RRC connection state.

The UE performs the cell selection process for performing the RRC connection re-establishment process (step, S720). Although the UE maintains the RRC connection state, the cell selection process may be performed identically to the cell selection process that the UE performs in the RRC idle state.

The UE determines whether the corresponding cell is proper by verifying the system information of the corresponding cell after performing the cell selection process (step, S730). If it is determined that the selected cell is a proper E-UTRAN cell, the UE transmits the RRC connection re-establishment message to the corresponding cell (step, S740).

Meanwhile, if the cell selected through the cell selection process for performing the RRC connection re-establishment process is determined to be the cell that uses different RAT except the E-UTRAN, the RRC connection re-establishment process is interrupted, and the UE enters the RRC idle state (step, S750).

The UE may be implemented to complete the verification of the suitability of the cell within a limited time through the cell selection process and receiving the system information of the selected cell. For this, the UE may drive a timer in accordance with the start of the RRC connection re-establishment process. The timer may be interrupted if it is determined that the UE selects a proper cell. When the timer is terminated, the UE may enter the RRC idle state by regarding the RRC connection re-establishment as failed. The timer will be referred to as the radio link failure timer below. In the LTE specification TS 36.331, the timer whose name is T311 may be utilized as the radio link failure timer. The UE may acquire the setting value of the timer from the system information of the serving cell.

When receiving the RRC connection re-establishment request message from the UE and accepting the request, the cell transmits the RRC connection re-establishment message to the UE.

The UE that receives the RRC connection re-establishment message from the cell reconfigures the PDCP sub layer for SRB1 and the RLC sub layer. In addition, the UE recalculates all sorts of key values related to the security setting and reconfigures the PDCP sub layer that is in charge of the security as newly calculated security key values. Through this, SRB1 is open between the UE and the cell and the RRC control message may be exchanged. The UE completes the start of SRB1, and transmits the RRC connection re-establishment complete message which is that the RRC connection re-establishment process is completed to the cell.

Meanwhile, if the cell receives the RRC connection re-establishment request message and does not accept the request, the cell transmits a RRC connection reestablishment reject message to the UE.

When the RRC connection re-establishment process is successfully performed, the cell and the UE perform the RRC connection reconfiguration process. Through this, the UE recovers the state prior to performing the RRC connection re-establishment process, and guarantees the continuity of the service as much as possible.

Next, the description related to RLF reporting will be followed.

In order to support the mobility robustness optimization (MRO) of network, when the RLF occurs or the handover failure occurs, the UE reports such failure event to the network.

After the RRC connection re-established, the UE may provide the RLF report to the eNB. The radio measurement included in the RLF report may be used for identifying the coverage problems as a potential reason of failure. The information may exclude such events in the MRO evaluation for the intra-LTE mobility connection failure, and may use the events for the input of other algorithms.

When the RRC connection re-establishment is failed or the UE is unable to perform the RRC connection re-establishment, the UE reconnects in the idle mode, and then may generate the effective RLF report for the eNB. For this purpose, the UE may save the latest RLF or the information related to the handover failure, and may indicate the LTE cell that the RLF report is valid at every RRC connection (re)establishment and the handover until the RLF report is loaded by the network or for 48 hours after the RLF or handover failure is detected.

The UE maintains the information for the state shift and change of the RAT, and indicates again that the RLF report is valid after going back to the LTE RAT.

The validity of the RLF report in the RRC connection configuration procedure is that the UE undergoes the disturbance such as a connection failure and indicates that the RLF report hasn't been yet transferred to the network due to the failure. The RLF report from the UE includes the following information.

The last cell that has provided service to the UE (in case of the RLF) or the E-CGI of the target of handover. If the E-CGI is not known, the PCI and the frequency information are used instead of it.

The E-CGI of the cell that tried the re-establishment.

The E-CGI of the cell that provides service to the UE when the last handover is initialized, for example, when the message 7 (the RRC connection reconfiguration) is received by the UE.

The time lapsed from the last handover initialization to the connection failure.

The information indicating whether the connection failure is due to the RLF or the handover failure.

The radio measurements.

The location of failure.

The eNB that receives the RLF failure from the UE may forward the report to the eNB that has provided service to the UE before the connection failure reported. The radio measurements included in the RLF report may be used for identifying the coverage issues which are the potential causes of the radio link failure. The information may exclude the events from the MRO evaluation of the intra-LTE mobility connection failure and may be used to resend them as the input for other algorithm.

Hereinafter, a measurement and a measurement report will be described.

Supporting the mobility of the UE is required in the mobile communication system. Therefore, the UE continuously measures the quality for a serving cell that provides the service at present and the quality for a neighboring cell. The UE reports the measurement result to the network at an appropriate time and the network provides optimal mobility for the UE through handover. The measurement for the object is often called a radio resource management (RPM) measurement.

The UE may perform the measurement having a specific object set by the network and report the result of the measurement to the network in order to provide information that may help an operator to operate the network in addition to the object of supporting the mobility. For example, the UE receives the broadcast information of a specific cell decided by the network. The UE may report a cell identity (also referred to as a global cell identity) of the specific cell, identification information (for example, tracking area code) to which the specific cell belongs, and/or other cell information (for example, whether the specific cell is a member of the closed subscriber group (CSG) cell) to the serving cell.

When the UE which is moving verifies that the quality of a specific region is too bad through the measurement, positional information on cells having the bad quality and the measurement result may be reported to the network. The network may attempt optimization of the network based on reporting of measurement results of UEs that help operating the network.

In the mobile communication system of which a frequency reuse factor is 1, mobility is generally made among different cells in the same frequency band. Therefore, in order to well assure the mobility of the UE, the UE may well measure the quality and cell information of the neighboring cells having the same center-frequency as the serving cell. The measurement for a cell having the same center-frequency as the serving cell as such is called an intra-frequency measurement. The UE reports the measurement result to the network at an appropriate time by performing the intra-frequency measurement to achieve the object of the corresponding measurement result.

The mobile communication operator may operate the network by using a plurality of frequency bands. When the service of the communication system is provided through the plurality of frequency bands, the UE needs to be able to measure the quality and cell information of the neighboring cells having a different center-frequency from the serving cell for assuring the optimized mobility for the UE. The measurement for a cell having the different center-frequency as the serving cell as such is called an inter-frequency measurement. The UE needs to be able to report the measurement result to the network at an appropriate time by performing the inter-frequency measurement.

In case that a UE supports the measurement for the network based on different RAT, the UE may also measure the cell of the corresponding network by the BS configuration. The measurement is referred to as an inter-radio access technology (RAT) measurement. For example, the RAT may include the UMTS terrestrial radio access network (UTRAN) and the GSM EDGE radio access network (GERAN), and also include the CDMA 2000 system that complies with 3GPP2 standard.

Figure 8:
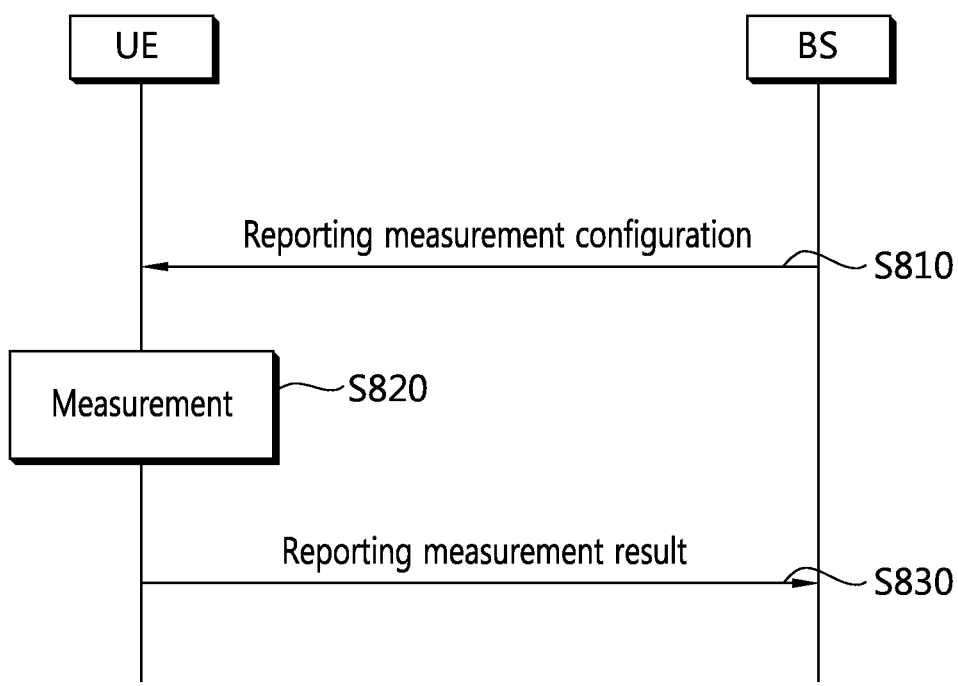
FIG. 8 is a flowchart illustrating the existing method of performing measurement.

FIG. 8 is a flowchart illustrating the existing method of performing measurement.

A UE receives the measurement configuration information from a BS (step, S810). The message that includes the measurement configuration information is called a measurement configuration message. The UE performs the measurement based on the measurement configuration information (step, S820). If the measurement result satisfies the report condition in the measurement configuration information, the UE reports the measurement result to the BS (step, S830). The message that includes the measurement result is called a measurement report message.

The measurement configuration information may include the following information.

(1) Measurement object information: Represents information on the object for which the UE will perform the measurement. The measurement object includes at least one among an intra-frequency measurement object which is the object of an intra-measurement, an inter-frequency measurement object which is the object of an inter-measurement, and an inter-RAT measurement object which is the object of an inter-RAT measurement. For example, the intra-frequency measurement object may indicate a neighboring cell having the same frequency band as the serving cell, the inter-frequency measurement object may indicate a neighboring cell having a different frequency band from the serving cell, and the inter-RAT measurement object may indicate a neighboring cell having different RAT from the serving cell.

(2) Reporting configuration information: Represents information on the reporting condition and the report type regarding when the UE reports the measurement result. The reporting condition may include information on an event or a cycle that triggers reporting the measurement result. The report type represents information regarding in which type the measurement result is configured.

(3) Measurement identity information: Represents information on the measurement identity to decide which measurement object, at a time when, and in which type the UE reports by associating the measurement object with the report configuration. The measurement identity information is included in the measurement report message, and as a result, it can represent that for which measurement object the measurement result is and under which reporting condition the measurement report occurs.

(4) Quantity configuration information: Represents information on the parameter for configuring filtering a measurement unit, a report unit, and/or a measurement result value.

(5) Measurement gap information: Represents information on the measurement gap which is an interval that the UE may use only for the measurement without considering data transmission with the serving cell because downlink transmission or uplink transmission is not scheduled.

The UE has a measurement object list, a measurement report configuration list, and a measurement identity list in order to perform the measurement procedure.

In the 3GPP LTE, the BS may configure only one measurement object for one frequency band to the UE. According to Phrase 5.5.4 of 3GPP TS 36.331 V8.5.0 (2009-03) "Evolved Universal Terrestrial Radio Access (E-UTRA) Radio Resource Control (RRC); Protocol specification (Release 8)", events that trigger a measurement report illustrated in a table described below are defined.

TABLE 1

| Event | Reporting conditions |
| --- | --- |
| Event A1 | Serving becomes better than threshold |
| Event A2 | Serving becomes worse than threshold |
| Event A3 | Neighbour becomes offset better than serving |
| Event A4 | Neighbour becomes better than threshold |
| Event A5 | Serving becomes worse than threshold1 and neighbour becomes better than threshold2 |
| Event B1 | Inter RAT neighbour becomes better than threshold |
| Event B2 | Serving becomes worse than threshold1 and inter RAT neighbour becomes better than threshold2 |

When the measurement result by the UE satisfies the configured event, the UE transmits the measurement report message to the BS.

Figure 9:
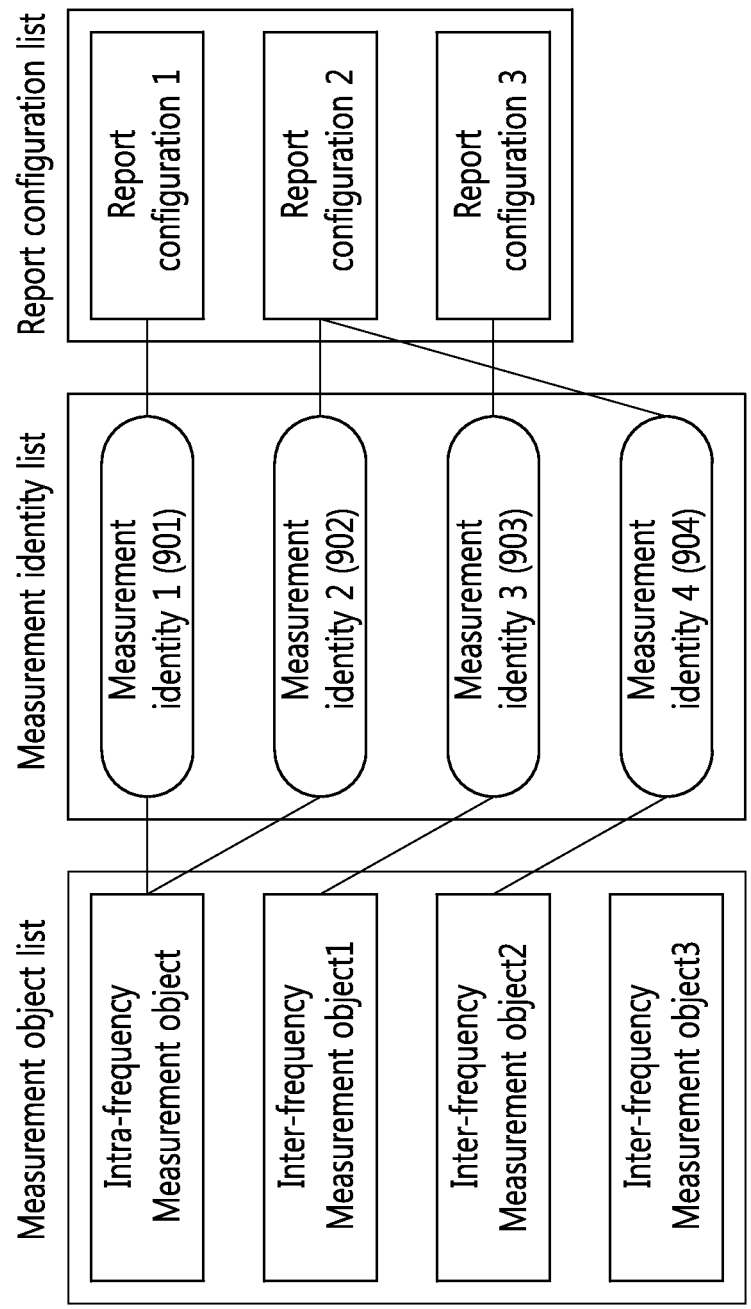
FIG. 9 illustrates an example of the measurement configuration configured for the UE.

FIG. 9 illustrates an example of the measurement configuration configured for the UE.

First, a measurement identity 1 901 connects an intra-frequency measurement object and a report configuration 1 to each other. The UE performs the intra frequency measurement and the report configuration 1 is used to decide a criterion and a type of reporting of the measurement result.

A measurement identity 2 902 is connected with the intra-frequency measurement object similarly as the measurement identity 1 901, but connects the intra-frequency measurement object to a report configuration 2. The UE performs the intra frequency measurement and the report configuration 2 is used to decide the criterion and the type of reporting of the measurement result.

The UE transmits the measurement result even though the measurement result for the intra-frequency measurement object satisfies any one of the report configuration 1 and the report configuration 2, by the measurement identity 1 901 and the measurement identity 2 902.

A measurement identity 3 903 connects an inter-frequency measurement object 1 and a report configuration 3 to each other. When a measurement result for the inter-frequency measurement object 1 satisfies the reporting condition included in the report configuration 3, the UE reports the measurement result.

A measurement identity 4 904 connects an inter-frequency measurement object 2 and the report configuration 2 to each other. When a measurement result for the inter-frequency measurement object 2 satisfies the reporting condition included in the report configuration 2, the UE reports the measurement result.

Meanwhile, the measurement object, the report configuration, and/or the measurement identity may be added, changed, and/or deleted. The addition, the change, and/or the deletion may be instructed by sending a new measurement configuration message or sending a measurement configuration change message to the UE.

Figure 10:
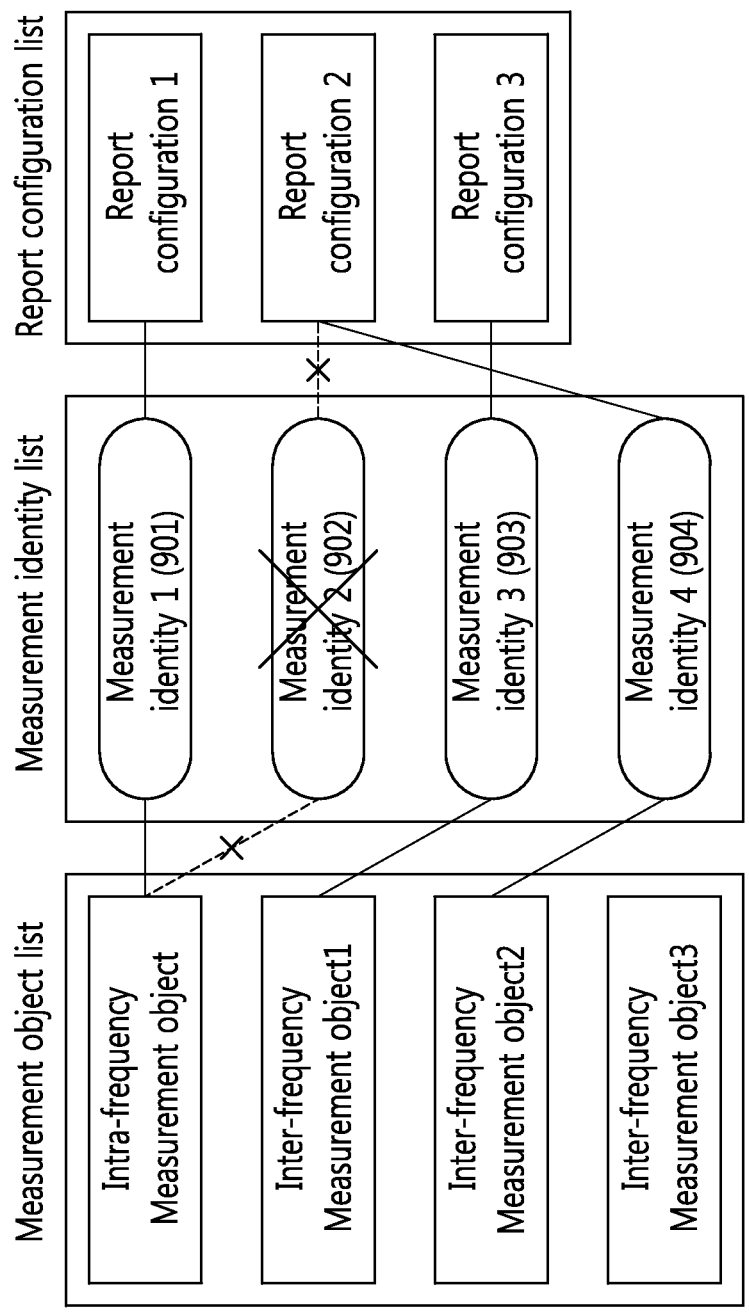
FIG. 10 illustrates an example of deleting a measurement identity.

FIG. 10 illustrates an example of deleting a measurement identity. When the measurement identity 2 902 is deleted, the measurement for a measurement object associated with the measurement identity 2 902 is stopped and the measurement report is not also transmitted. The measurement object or the report configuration associated with the deleted measurement identity may not be changed.

Figure 11:
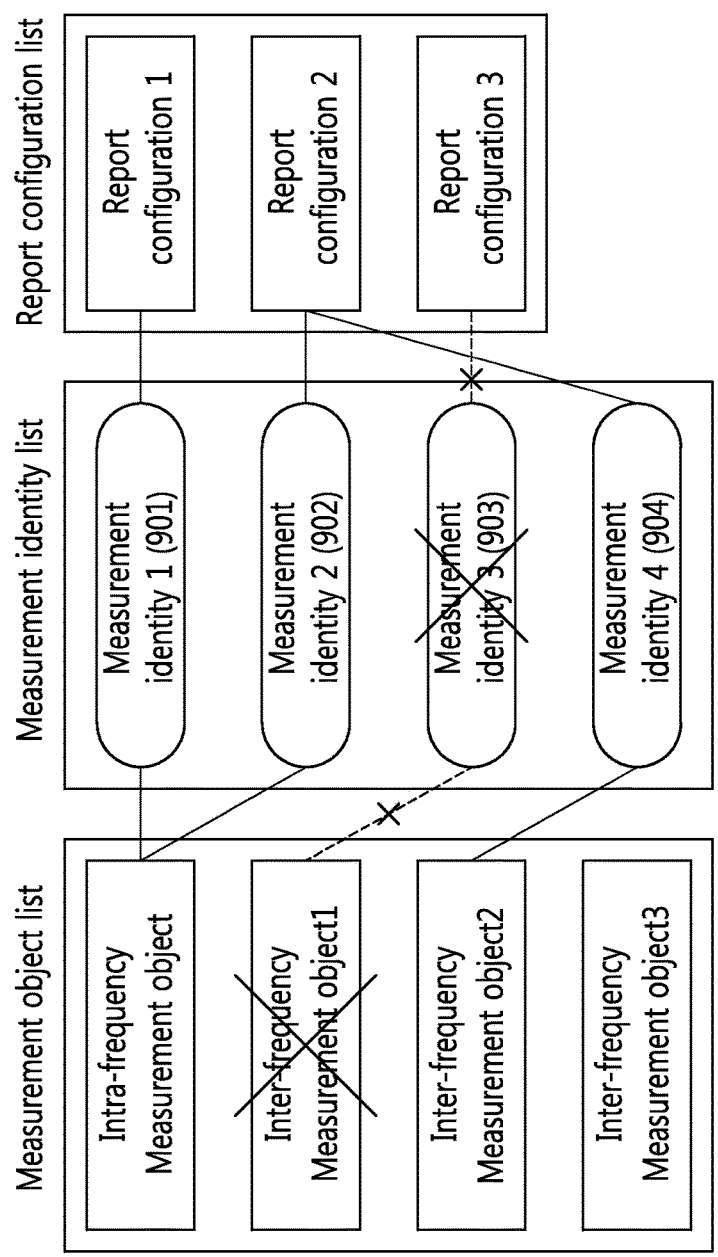
FIG. 11 illustrates an example of deleting a measurement object.

FIG. 11 illustrates an example of deleting a measurement object. When the inter-frequency measurement object 1 is deleted, the UE also deletes the associated measurement identity 3 903. The measurement for the inter-frequency measurement object 1 is stopped and the measurement report is not also transmitted. However, the report configuration associated with the deleted first inter-frequency measurement object may not be changed or deleted.

When the report configuration is removed, the UE removes even the associated measurement identity. The UE stops measuring the associated measurement object by the associated measurement identity. However, the measurement object associated with the deleted report configuration may not be changed or deleted.

The measurement report may include the measurement identity, the measured quality of the serving cell, and the measurement result of the neighboring cell. The measurement identity identifies a measurement object in which the measurement report is triggered. The measurement result of the neighboring cell may include the cell identity and the measured quality of the neighboring cell. The measured quality may include at least one of reference signal received power (RSRP) and reference signal received quality (RSRQ).

Subsequently, the scaling of the parameter related to mobility that influences on whether a UE determines to perform the movement according to the mobility state of the UE. In case that the UE fast moves through cells, it may fall into the disable state of service since the mobility to neighboring cells are not timely performed. Accordingly, the mobility performance is improved by optimizing the value of the parameter related to the mobility with the speed of the UE according to the speed of the UE. As described above, by determining the mobility status (performing the MSE) and scaling the parameter related to the mobility determination according to the mobility status of the UE determined by the UE, the mobility of the UE may be more effectively supported.

The mobility state of the UE which is decided by the MSE may be divided into a high mobility state, a medium mobility state and a normal mobility state. Each mobility state may be determined on the basis of the number of the handover performed by the UE and/or the number of the cell reselection performed.

The UE in the state of RRC_IDLE performs the cell reselection if the cell reselection criteria are satisfied. If the number of the cell reselection performed by the UE for the specific time interval ($T_{CRmax}$) exceeds the first threshold value ($N_{CR\_H}$), the mobility state of the UE satisfies the condition of the high mobility state. Meanwhile, if the number of the cell reselection performed by the UE for the specific time interval ($T_{CRmax}$) exceeds the second threshold value ($N_{CR\_M}$) and does not exceed the first threshold value ($N_{CR\_H}$), the mobility state of the UE satisfies the condition of the medium mobility state. If the number of the cell reselection performed by the UE for the specific time interval ($T_{CRmax}$) does not exceed the second threshold value ($N_{CR\_M}$), the mobility state of the UE satisfies the condition of the normal mobility state. However, in case that the UE continually performs the cell reselection between the two identical cells, it may not be counted as the number of the cell reselection performed.

If a specific condition is satisfied when measuring the neighboring cell, the UE in the RRC_CONNECTED state reports the result of the measurement and performs the handover. If the number of the handover performed by the UE for the specific time interval exceeds the first threshold value, the mobility state of the UE satisfies the condition of the high mobility state. Meanwhile, if the number of the handover performed by the UE for the specific time interval exceeds the second threshold value and does not exceed the first threshold value, the mobility state of the UE satisfies the condition of the medium mobility state. If the number of the handover performed by the UE for the specific time interval does not exceed the second threshold value, the mobility state of the UE satisfies the condition of the normal mobility state.

If the UE in the RRC_IDLE or RRC_CONNECTED state detects that the above described condition of the mobility state is satisfied, it may enter into the corresponding mobility state. Entering into the corresponding mobility state might be the determination of the UE that its mobility state is the corresponding mobility state. However, if it is determined that both condition of the high mobility state and of the normal mobility state are not satisfied for a specific time interval, the UE may enter into the normal mobility state.

The UE which detects the mobility state may perform scaling the mobility parameter on the basis of the mobility state. The UE in the RRC_IDLE state may perform scaling the Treselection parameter, and the UE in the RRC_CONNECTED state may perform scaling the TimeToTrigger parameter. The scaling may be implemented by multiplying a specific scaling factor to the Treselection parameter or the TimeToTrigger parameter. The scaling factor may be different according to the mobility state of the UE. For example, the scaling factor in the high mobility state may be smaller than the scaling factor in the medium mobility state. The scaling may not be performed in the medium mobility state. The scaling may be performed by the network or the cell as well as by the UE, and the information for this may be given to the UE.

First, the scaling applied to the Treselection parameter used for the reselection of a cell by the UE in the RRC_IDLE state will be described in detail.

1) In case of the normal mobility state (neither the medium nor the high mobility state)
Scaling Treselection is not performed.

2) In case of the high mobility state
Scaling is performed by multiplying the scaling factor sf-high to the Treselection$_{EUTRA}$ in the E-UTRAN.
Scaling is performed by multiplying the scaling factor sf-high to the Treselection$_{UTRA}$ in the UTRAN.
Scaling is performed by multiplying the scaling factor sf-high to the Treselection$_{GERA}$ in the GERAN.
Scaling is performed by multiplying the scaling factor sf-high to the Treselection$_{CDMA\_HRPD}$ in the CDMA2000 HRPD.
Scaling is performed by multiplying the scaling factor sf-high to the Treselection$_{CDMA\_1xRTT}$ in the CDMA2000 1xRTT.

3) In case of the medium mobility state
Scaling is performed by multiplying the scaling factor sf-medium to the Treselection$_{EUTRA}$ in the E-UTRAN.
Scaling is performed by multiplying the scaling factor sf-medium to the Treselection$_{UTRA}$ in the UTRAN.
Scaling is performed by multiplying the scaling factor sf-medium to the Treselection$_{GERA}$ in the GERAN.
Scaling is performed by multiplying the scaling factor sf-medium to the Treselection$_{CDMA\_HRPD}$ in the CDMA2000 HRPD.
Scaling is performed by multiplying the scaling factor sf-medium to the Treselection$_{CDMA\_1xRTT}$ in the CDMA2000 1xRTT.

The information parameter (e.g., scaling factor) needed for scaling the Treselection parameter by the UE in the RRC_IDLE state may be provided for the UE with being included in the system information which is broadcasted. The UE may perform scaling if the information parameter for scaling is included in the system information.

Next, the scaling applied to the TimeToTrigger parameter, which is used when the UE in the RRC_CONNECTED state reports the measurement and/or the handover will be described in detail.

1) In case of the normal mobility state (neither the medium nor the high mobility state)
Scaling the TimeToTrigger is not performed.

2) In case of the high mobility state
Scaling is performed by multiplying the scaling factor sf-high to the TimeToTrigger.

3) In case of the medium mobility state
Scaling is performed by multiplying the scaling factor sf-medium to the TimeToTrigger.

As described above, more proper mobility performance may be executed by applying a different mobility parameter according to the mobility state of the UE. For example, in case that the UE in state of RRC_IDLE moves fast, whether to satisfy the condition for performing the cell reselection can be determined within a shorter time, and consequently, the cell reselection can be quickly performed to the target cell. In addition, in case that the UE in the state of RRC_CONNECTED moves fast, whether to satisfy the condition for reporting the measurement result can be determined within a shorter time and reported, and consequently, the handover can be more quickly performed to the target cell.

Like the mobility state estimated through the MSE above described, the mobility state of a UE may be implemented by various types. The mobility state of a UE may be represented by actual speed of the UE. Also, the mobility state of a UE may be represented by the number of performing cell movement (cell reselection and/or handover) of the UE itself which is counted for the MSE.

The multiple mobility states of specific types may be grouped and become the state of multiple mobility groups. Here, the grouping may be performed such that the number of mobility group states is smaller than the number of mobility group states. For example, among three mobility states estimated through the MSE, the normal mobility state, the middle mobility state and the high mobility state, the normal mobility state may be grouped into the first mobility group state, and the middle mobility state and the high mobility state may be grouped into the second mobility group state. Or, the normal mobility state and the middle mobility state may be grouped into the first mobility group state, and the high mobility state may be grouped into the second mobility group state. As another example, the grouping may also be applied to the mobility state that is represented as the speed of UE, and in this case, a specific speed range may be grouped into a specific mobility group state.

Each mobility group state may be configured to include at least one mobility state. When a UE corresponds to a specific mobility state, it may mean that the mobility state of the UE corresponds to one of at least one mobility state included in the corresponding mobility group state.

The grouping for the mobility group state may be configured by a network through the system information or the dedicated signaling, or preset to the UE.

The mobility information that indicates the mobility state may be important source that the network determines the optimal configuration for the UE or the optimal network operation policy. For example, if the network knows the mobility state of UE, it may be helpful for decreasing the possibility of the handover failure or other sort of connection failures.

However, the network may not know whether the UE has valid mobility information for the UE. In a communication system, if the UE is configured to report the mobility information of UE to the network in a short cycle, this may cause the problem that the overhead of signaling and the power consumption of UE abruptly increase. In addition, in case that the mobility information is updated, if the previous mobility information is reported by the UE and it is not triggered to report the updated mobility information, the network may not know the updated mobility information.

As a result, if the network does not adequately acquire the mobility information for the mobility state of UE, it is hard to perform the optimal network operation considering the determination of optimal configuration for UE and/or the mobility state of each UE, and if the mobility information is excessively reported, the problem of increasing the signaling overhead and excessive power consumption of UE may occur.

Accordingly, in the present invention, a reporting method is suggested to acquire the merit by virtue of reporting the mobility information for a UE to network, but to prevent unnecessary signaling for the mobility state of the UE.

First, in the present invention, the mobility information which is the object for reporting will be described in detail.

The mobility information may indicate the mobility state of a specific type. For example, the mobility information may be configured to indicate how fast the UE moves, how frequently the UE changes the serving cell, or which one is the mobility state currently estimated. The detailed mobility information may be implemented by various types as below.

1) The mobility information may indicate the mobility state of the UE which is determined the latest by the UE through the MSE till the reporting time.

2) The mobility information may indicate the speed of UE which is acquired the latest by the UE till the reporting time. The speed of UE may be the result measured by using GNSS device provided by the UE. The speed of UE may be the instantaneous speed at a specific time or the average speed of UE during a specific time interval.

3) The mobility information may indicate the mobility group state of UE. The mobility state may be grouped by the mobility states which are estimated by the MSE. The mobility group state may be grouped by a specific speed section, for example, by the mobility state set which may be estimated through the MSE and by the first mobility group state G1 and the second mobility group state G2 among the normal, middle and high mobility. In this time, a grouping is considered that is defined by G1={normal mobility, middle mobility} and G2={high mobility}. As another grouping method, a grouping defined by G1={normal mobility} and G2={middle mobility, high mobility} is considered. The mobility information according to the example may indicate one among the mobility group states where the mobility state which is estimated through the MSE of UE is included, that is, G1 and G2.

4) The mobility information may indicate the list of cell that the UE camps on until now and the time when camping on each cell. In this case, the UE may generate the mobility information by storing the camp on cell list including maximum N cells and the time when the UE comps on the corresponding cell.

The mobility information may be configured to indicate the mobility state of at least one type among the types described above.

The network may designate the type of mobility information that the UE will report. In case that the network designates the type of mobility information that the UE will report, the network provides the parameter required to implement the mobility information according to the corresponding type to the UE. The designation of mobility information by the network may be performed through the broadcast signaling and/or the designated signaling.

When the UE camps on a non-LTE RAT, the UE may be configured not to acquire the mobility information. In this case, the UE may be configured to report the mobility information in case that the UE camps on the cell of the same RAT as the RAT of the cell that camps on when acquiring the mobility information.

On the other hand, the UE may be configured to acquire the mobility information during camping on a non-LTE RAT. In this case, even in case that the UE camps on the cell of different RAT from the RAT of the cell that camps on when acquiring the mobility information, the UE may be configured to report the mobility information.

When camping on a small cell, the UE may be configured not to acquire the mobility information. That is, in case that the UE is a small cell or is camping on a certain cell indicated by a cell, which is not a macro cell, the UE may be configured not to acquire the mobility information.

If the UE camps on the cell having the cell identifier within the cell identifier range (e.g., PCI) which is reserved for the cell of a specific type, the UE may be configured not to acquire the mobility information. The cell of the specific type may be a CSG cell and/or a hybrid cell.

In case that the UE camps on a small cell, the UE may be configured to acquire the mobility information related to a macro cell instead of the serving cell or to the macro cell. The macro cell may be a cell which is operating on the same frequency as that of the serving cell. In case that there are multiple macro cells, it may be the macro cell of the best signal quality on the corresponding frequency. The macro cell may be a cell which is operating on different frequency from that of the serving cell. If there are multiple macro cells, it may be the macro cell on the frequency of the best quality.

The embodiment related to reporting the mobility information described above may be implemented by FIG. 12 below.

Figure 12:
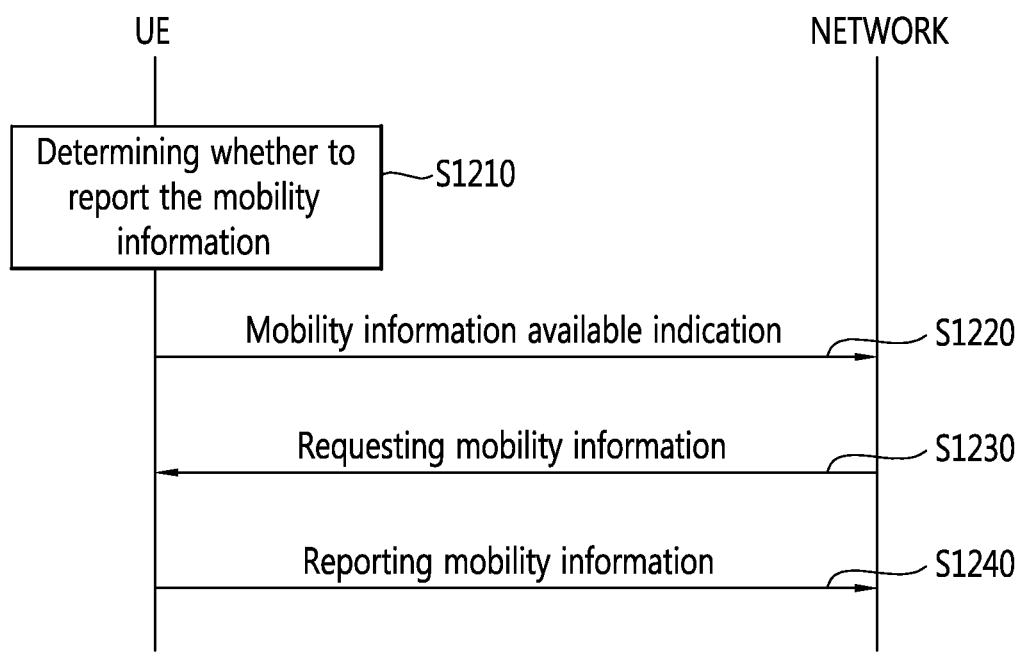
FIG. 12 is a flowchart illustrating a mobility information reporting method according to an embodiment of the present invention.

FIG. 12 is a flowchart illustrating a mobility information reporting method according to an embodiment of the present invention.

Referring to FIG. 12, a UE determines whether to report the mobility information (step, S1210). The determination of whether to report the mobility information may be determining whether to transmit a mobility information available indication for the mobility information report.

The determination of whether to report the mobility information may be divided by the determination for initially reporting the mobility information to the network or the determination for reporting the updated mobility information to the network.

According to the initial mobility information report, in case that the UE has the mobility information to report, but has never reported it previously, the UE may decide to report the corresponding mobility information. Additionally, in case that the UE has the mobility information to report, but indicates a mobility state according to the type of specific mobility information or indicates a specific mobility state according to the type of specific mobility information, the UE may decide to report the corresponding mobility information. For example, if the type of mobility state indicated by the mobility information that the UE has is the mobility state according to the estimation by the MSE and the estimated mobility state is the high mobility state, the UE may decide to report the mobility information.

According to the updated mobility information report, in case that the UE has reported the mobility information previously, if the mobility information that has been reported and the mobility information that has been currently kept are different and the current mobility information satisfies the reporting condition, the UE may decide to report the mobility information or transmit the mobility information available indication. The determination whether to satisfy the reporting condition for the mobility information may be as follows.

1) If the type of mobility state indicated by the current mobility information is the same as that of the mobility state indicated by the mobility information which has been already reported and the mobility state indicated by the current mobility information is different from the mobility state indicated by the mobility information which has been already reported, the UE may determine that the reporting condition of the mobility information is satisfied.

For example, if the mobility information that the UE already reported indicates a specific mobility state (e.g., normal mobility state) and the current mobility information that the UE acquires indicates a different mobility state (e.g., high mobility state), the UE determine that the reporting condition of the mobility information is satisfied. Meanwhile, if the type of mobility state is the speed of UE, the threshold value for difference of two speed values may be applied and compared. The threshold value may be signaled by the network or preset to the UE.

2) If the type of mobility state indicated by the current mobility information is not the same as that of the mobility state indicated by the mobility information which has been already reported, the UE may determine that the reporting condition of the mobility information is satisfied. For example, if the mobility information that the UE already reported indicates a specific mobility state (e.g., middle mobility state) and the current mobility information that the UE acquires indicates the speed of UE (e.g., the speed value acquired through the GNSS), the UE determine that the reporting condition of the mobility information is satisfied.

Meanwhile, the network may transmit the mobility information control information for determining whether to report the mobility information of UE to the UE. The mobility information control information may be transmitted through the broadcast signaling of the serving cell and/or through the dedicated signaling for the UE by the serving cell. The mobility information control information may indicate whether the mobility information report of the UE is permitted. Also, the mobility information control information may indicate the condition for the reportable mobility information as well as whether the report is permitted. In determining whether to satisfy the mobility information reporting condition of the UE, the mobility information control information may be configured to indicate a specific determining condition. Based on the mobility information control information which is received, the UE may determine whether to permit reporting the mobility information and whether to report the mobility information.

In case that the UE receives the mobility information control information from the network but the mobility information control information indicates whether to permit reporting, if reporting is permitted, the UE may determine whether the mobility information that the UE has satisfies the reporting condition described above. If the mobility information control information indicates that the report is not permitted, the UE may not determine whether to report the mobility information or may determine not to report it.

In case that the UE receives the mobility information control information from the network but the mobility information control information indicates whether to permit reporting and the condition for mobility information, if reporting is permitted, the UE may determine whether the mobility information that the UE has satisfies the condition indicated by the mobility information control information. If the mobility information satisfies the condition, the UE may determine whether to report the mobility information through determining whether the mobility information satisfies the reporting condition described above. For example, in case that the mobility information control information indicates that reporting of the mobility information is permitted and the serving cell transmits the mobility information control information indicating the type of mobility information through the broadcast signaling or the dedicated signaling, if the UE supports the implementation of mobility information of the indicated type, the UE may determine that reporting the mobility information is permitted. Subsequently, the UE may determine whether its mobility information satisfies the reporting condition.

The UE decided to report the mobility information may transmit the mobility information available indication to the network (step, S1220). The mobility information available indication may indicate that the UE has the mobility information to report. This may be implemented by 1 bit in a specific RRC message.

The transmission of the mobility information available indication may be performed during the procedure that the UE establishes the RRC connection, re-establishes the RRC connection with the network, and of the handover. For example, the mobility information available indication may be transmitted with being included in the uplink message such as the RRC connection configuration completion message, the RRC connection re-establishment completion message, or the RRC connection reconfiguration completion message. The procedure or the RRC message in which the UE sends the mobility information available indication is not limited to the numerated procedure or the RRC message.

The UE may transmit the information indicating the type of mobility state which is indicated by the mobility information to be reported together with the mobility information available indication to the network. The information indicating the type may be configured to indicate at least one of the types of mobility state described above.

The network may request the UE to report the mobility information (step, S1230). Even in case of not receiving the mobility information available indication from the UE, the network may request the UE to report the mobility information. In this case, the request for reporting the mobility information may be performed with a predetermined cycle or performed in case that a specific event occurs or a specific condition is satisfied.

The request for reporting the mobility information may be performed as a response to the mobility information available indication. When receiving mobility information available indication, the network may request to report the mobility information as a response to this. When requesting report of the mobility information, the network may determine whether to request based on the information indicating the type of mobility state which is included in the mobility information available indication. In case of the type of the specific mobility state, the network may be configured to request the report of the mobility information or not to request the report.

The request for reporting the mobility information may be performed by transmitting the mobility information request parameter with being included in the RRC message. The corresponding RRC message may be the UE information request message.

If the UE is requested to report the mobility information, the UE may report the mobility information to the network (step, S1240). The mobility information reported by the UE may be the latest updated information. The report for the mobility information may be performed by transmitting the mobility information parameter with being included in the RRC message. The corresponding RRC message may be the UE information report message.

Meanwhile, in case that the UE transmits the mobility information available indication to the network and receives the mobility information reporting request as a response to this, the UE may be configured to report its mobility information to the network without further step of determination. It is because it may be not required to decide whether to report according to the reporting request since whether to report the mobility information is already decided before transmitting the mobility information available indication.

On the other hand, in case that the UE does not transmit the mobility information available indication to the network and receives the mobility information reporting request, the UE may be configured to report according to the decision of whether to report the mobility information. The decision of whether to report the mobility information may be performed like step of S1210. In case that the mobility information reporting request is not transmitted, the decision of whether to report the mobility information by the UE is not reflected to the reporting request of the network. Accordingly, the UE may determine whether to report the mobility information, and accordingly, report the mobility information. If the UE decides to report the mobility information, the UE may transmit the mobility information to the network. In this case, the UE may transmit the mobility information with being included in the UE information report message to the network. If the UE decides not to report the mobility information, the UE may not transmit the mobility information to the network. In this case, the UE may transmit the UE information report message as a response to the mobility information reporting request, but the mobility information may not be included in the corresponding message. Also, in the UE information report message, the information indicating the decision of not to report the mobility information may be included.

As described in the embodiment with reference to FIG. 12 unlike that the UE reports the mobility information to the network as a response of the request to report the mobility information from the network, the UE may report the mobility information which is autonomously decided to report. In this case, the UE may report the mobility information through a specific RRC procedure (the RRC connection establishment, the RRC connection reconfiguration (including the case of handover), the measurement and report, and so on) with the network without the request of the network. However, even in this case, the UE may decide whether to report its mobility information, and if the UE decides to report it, the UE may transmit the mobility information with being included in a specific RRC message (the RRC connection configuration completion message, the RRC connection re-establishment completion message, the RRC connection reconfiguration completion message, the measurement report message, and so on) to the network. Since it is described above, detailed implementation of the mobility information and the procedure of determining whether to report the mobility information will be omitted.

When the network receives the mobility information, the network may perform the network operation based on this. For example, the network may manage the mobility of UE based on the mobility information of UE. This may be implemented by the handover management of the UE in a source cell.

When receiving the mobility information, the serving cell (source cell) may transmit the mobility information to a target cell as a part of the UE context and/or the UE configuration during preparing the handover.

In deciding whether to transmit the mobility information to the target cell, the source cell may decide it based on how long the UE is connected with the source cell. For example, if the UE maintains the connection longer than a specific threshold value, the source cell may decide not to transmit the mobility information to the target cell. Otherwise, the source cell may decide to transmit the mobility information to the target cell.

In deciding whether to transmit the mobility information to the target cell, the source cell may decide it based on the mobility information received. For example, in case that the mobility state of the UE indicated by the received mobility information is higher than a specific threshold mobility state or is a specific mobility state, the source cell may decide to transmit the mobility information to the target cell. Otherwise, the source cell may decide not to transmit the mobility information to the target cell. Also, in case that the mobility state of the UE indicated by the received mobility information is lower than a specific threshold mobility state, it may be implemented that the source cell transmits the mobility information to the target cell, and otherwise, decides not to transmit it.

According to the embodiments of the present invention, the network may know whether a UE has valid mobility information to report, and further know the type of mobility state indicated by the mobility information. According to this, the network may determine whether to acquire the mobility information from the UE according to the operation policy, the mobility state and/or the type of mobility state. In addition, the network may know whether the mobility information is updated, and accordingly, the network may acquire the updated mobility information and provide the UE with proper configuration information. Through the procedures, the excessive signaling overhead which may occur due to the mobility information report may be prevented, and it may be possible to perform the effective power management of the UE, the mobility management of the UE and the optimized network operation based on the mobility information which is reported.

Figure 13:
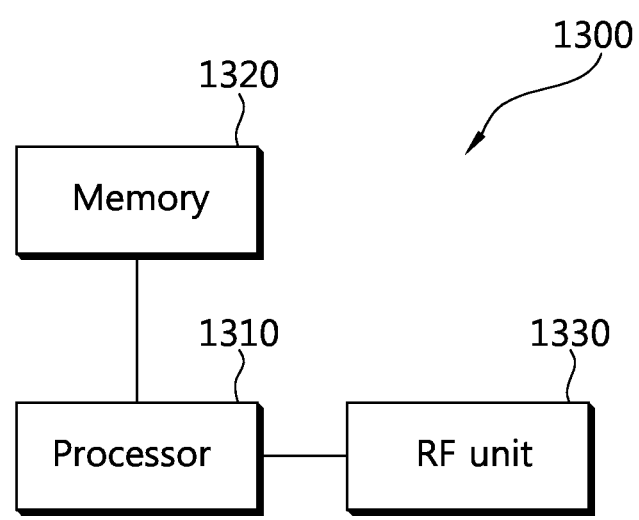
FIG. 13 is a block diagram illustrating the wireless apparatus in which an embodiment of the present invention can be implemented.

FIG. 13 is a block diagram illustrating the wireless apparatus in which an embodiment of the present invention can be implemented. The apparatus may be implemented to the UE and/or the operation of the network that performs the embodiments of the present invention with reference to FIG. 12.

The wireless apparatus 1300 includes a processor 1310, a memory 1320 and a RF unit 1330. The processor 1310 implements the proposed functions, processes and/or methods. The processor 1310 may be configured to acquire the mobility information indicating the mobility state of various types. The processor 1310 may be configured to decide whether to report the mobility information, and accordingly, to report it. The processor 1310 may be configured to transmit the identifier indicating that there is valid mobility information. The processor 1310 may be configured to manage the mobility related operation of UE based on the mobility state indicated by the mobility information, and setup the operation related to the power consumption of UE. The processor 1310 may be configured to manage the network operation based on the mobility information. The processor 1310 may be configured to implement the aforementioned embodiments with reference to the drawings.

The RF unit 1330 transmits and receives the radio signal with being connection to the processor 1310.

The processor 1310 and the RF unit 1330 may be implemented to transmit and receive the radio signal according to at least one the communication standard. The RF unit 1330 may include at least one transceiver that may transmit and receive the radio signal.

The processor may include Application-Specific Integrated Circuits (ASICs), other chipsets, logic circuits, and/or data processors. The memory may include Read-Only Memory (ROM), Random Access Memory (RAM), flash memory, memory cards, storage media and/or other storage devices. The RF unit may include baseband circuits for processing radio signals. When the embodiment is implemented in software, the aforementioned scheme may be implemented as a module (process or function) that performs the aforementioned function. The module may be stored in the memory and executed by the processor. The memory may be placed inside or outside the processor and may be connected to the processor using a variety of well-known means.

In the above exemplary system, although the methods have been described based on the flowcharts in the form of a series of steps or blocks, the present invention is not limited to the sequence of the steps, and some of the steps may be performed in a different order from that of other steps or may be performed simultaneous to other steps. Furthermore, those skilled in the art will understand that the steps shown in the flowchart are not exclusive and the steps may include additional steps or that one or more steps in the flowchart may be deleted without affecting the scope of the present invention.

What is claimed is:

1. A reporting method for mobility information performed by a user equipment (UE) in a wireless communication system, the method comprising:
    reporting, to a network, first mobility information;
    determining whether a mobility state type of second mobility information is the same as a mobility state type of the first mobility information,
    wherein the second mobility information is updated mobility information by the UE,
    wherein the mobility state type of the first mobility state information or the mobility state type of the second mobility state information is one of a mobility group state or a speed of the UE, and
    wherein the mobility group state includes at least one of a high mobility state, a middle mobility state or a normal mobility state, and each of the high mobility state, the middle mobility state and the normal mobility state is determined by a number of cell reselections by the UE; and
    reporting, to the network, the second mobility information based on the determination,
    wherein if the mobility state type of the second mobility information is different from the mobility state type of the first mobility information, the second mobility information is reported by the UE, and
    wherein if the mobility state type of the second mobility information is the same as the mobility state type of the first mobility information, the second mobility information is not reported by the UE.

2. The method of claim 1 further comprising:
    transmitting a mobility information available indication when the UE reports the second mobility information,
    wherein the mobility information available indication indicates that the second mobility information is available.

3. The method of claim 2 further comprising:
    receiving, from the network, a mobility information reporting request as a response to the mobility information available indication,
    wherein the reporting of the second mobility information includes reporting the second mobility information as a response to the mobility information reporting request.

4. The method of claim 3,
    wherein the mobility information reporting request is transmitted by being included in a radio resource control (RRC) message requesting to report the UE information.

5. The method of claim 2,
    wherein the mobility information available indication is transmitted by being included in a radio resource control (RRC) message when the UE requests a RRC connection.

6. The method of claim 1 further comprising:
    receiving, from the network, mobility information report control information,
    wherein the mobility information report control information indicates whether the report of the second mobility information is permitted.

7. The method of claim 6, wherein the reporting of the second mobility information includes reporting the second mobility information as a response to the mobility information report control information.

8. The method of claim 6, wherein the mobility information report control information further indicates a type of the mobility information in which the report is permitted.

9. The method of claim 1,
    wherein the second mobility information is transmitted by being included in a radio resource control (RRC) message transmitted to report the UE information.

10. The method of claim 1, wherein if the UE camps on a small cell, the second mobility information is information related to a macro cell having the same frequency as the small cell.

11. The method of claim 10, wherein if a plurality of macro cells having the same frequency as the small cell are present, the second mobility information is information related to a macro cell having the best quality among the plurality of the macro cells.

12. The method of claim 1,
    wherein the mobility state type of the first mobility state information is the mobility group state, and the mobility state type of the second mobility information is the speed of the UE.

13. A user equipment (UE), the UE comprising:
    a radio frequency (RF) unit that transmits and receives a radio signal; and
    a processor, operatively connected to the RF unit, that:
    reports, to a network via the RF unit, first mobility information,
    determines whether a mobility state type of second mobility information is the same as a mobility state type of the first mobility information,
    wherein the second mobility information is updated mobility information by the UE,
    wherein the mobility state type of the first mobility state information or the mobility state type of the second mobility state information is one of a mobility group state or a speed of the UE, and
    wherein the mobility group state includes at least one of a high mobility state, a middle mobility state or a normal mobility state, and each of the high mobility state, the middle mobility state and the normal mobility state is determined by a number of cell reselections by the UE, and
    reports, to the network via the RF unit, the second mobility information based on the determination,
    wherein if the mobility state type of the second mobility information is different from the mobility state type of the first mobility information, the second mobility information is reported by the UE, and
    wherein if the mobility state type of the second mobility information is the same as the mobility state type of the first mobility information, the second mobility information is not reported by the UE.

* * * * *